(12) United States Patent
Phillips et al.

(10) Patent No.: US 10,341,657 B2
(45) Date of Patent: Jul. 2, 2019

(54) SYSTEM AND METHOD FOR MITIGATING MOTION ARTIFACTS IN A MEDIA STREAMING NETWORK

(71) Applicant: TELEFONAKTIEBOLAGET LM ERICSSON (PUBL), Stockholm (SE)

(72) Inventors: Chris Phillips, Hartwell, GA (US); Kuheli Haldar, Suwanee, GA (US); Anthony Richard Jones, Farnham (GB)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 92 days.

(21) Appl. No.: 15/812,247

(22) Filed: Nov. 14, 2017

(65) Prior Publication Data
US 2019/0149819 A1 May 16, 2019

(51) Int. Cl.
*H04N 19/115* (2014.01)
*H04N 19/30* (2014.01)
*H04L 29/06* (2006.01)

(52) U.S. Cl.
CPC ......... *H04N 19/115* (2014.11); *H04L 65/607* (2013.01); *H04L 65/608* (2013.01); *H04N 19/30* (2014.11)

(58) Field of Classification Search
CPC .... H04N 19/115; H04N 19/30; H04L 65/607; H04L 65/608
See application file for complete search history.

(56) References Cited

U.S. PATENT DOCUMENTS

| | | | |
|---|---|---|---|
| 8,220,017 B1* | 7/2012 | Dan | G06F 16/40 725/32 |
| 8,744,123 B2 | 6/2014 | Bobbitt et al. | |
| 9,878,664 B2* | 1/2018 | Kentley-Klay | G10K 11/346 |
| 2004/0233844 A1* | 11/2004 | Yu | H04L 12/5602 370/230 |
| 2010/0158109 A1* | 6/2010 | Dahlby | H04N 7/17318 375/240.03 |
| 2012/0158802 A1 | 6/2012 | Lakshmanan et al. | |
| 2015/0281746 A1* | 10/2015 | Lam | H04N 21/2368 725/116 |
| 2016/0255348 A1* | 9/2016 | Panchagnula | H04N 19/115 375/240.02 |
| 2016/0360155 A1* | 12/2016 | Civanlar | H04N 7/152 |
| 2018/0285658 A1* | 10/2018 | Gunther | G08G 1/161 |

\* cited by examiner

*Primary Examiner* — Anner N Holder
(74) *Attorney, Agent, or Firm* — The Danamraj Law Group, P.C.

(57) ABSTRACT

A system and method for mitigating motion artifacts in a media streaming network, wherein a scheme for facilitating adaptive post-decode (PD) filtering at a client device is provided. Extraction of still area grid information is effectuated at a source media processing node. Extracted still area grid information is multiplexed with audio/video components for appropriately signaling to downstream devices based on media containerization deployed for distribution. A client device is operative to select a suitable PD filter based on a plurality of selection criteria and apply the selected PD filter to the still area grids of the decoded image frames.

22 Claims, 14 Drawing Sheets

SYSTEM AND METHOD FOR MITIGATING MOTION ARTIFACTS IN A MEDIA STREAMING NETWORK

TECHNICAL FIELD

The present disclosure generally relates to communication networks. More particularly, and not by way of any limitation, the present disclosure is directed to a system and method for mitigating motion artifacts in a media streaming network.

BACKGROUND

It is known that video compression allows efficient utilization of bandwidth in a media streaming network by reducing the number of bits to represent a picture. However, this typically results in video quality loss due to loss of information. It is also known that high motion scenes in a video sequence are harder to compress due to the presence of relatively large differences from picture to picture. Encoders typically soften the picture in complex encoded material due to high motion content. Whereas softening the picture masks some of the encoding artifacts, thereby improving picture quality in the motion areas, it degrades or causes a blurring effect in text or static areas of the picture.

SUMMARY

The present patent disclosure is broadly directed to systems, methods, apparatuses, devices, and associated non-transitory computer-readable media and network architecture for facilitating adaptive post-decode (PD) filtering at a client device in order to mitigate the artifacts introduced during the processing of high motion video in a media streaming network. In one arrangement, still area grid information is extracted from an incoming source at a source media processing node, which is multiplexed with encoded audio/video components for appropriately signaling to downstream devices based on a particular media containerization scheme deployed for distribution. A client device is operative to select a suitable PD filter based on a plurality of selection criteria and apply the selected PD filter to the still area grids of the decoded image frames.

In one aspect, an embodiment of a media processing method operative at a network node is disclosed. The claimed embodiment includes, inter alia, separating a video component and an audio component from an incoming source media input, and determining or extracting static object grid (SOG) coordinate information for still areas identified in the video component. The video component may be encoded at different bitrates to generate a plurality of adaptive bitrate (ABR) representations of the video component. The SOG coordinate information may be scaled with respect to each of the bitrate representations of the video component. The audio component may be encoded to generate an encoded audio stream. Thereafter, each bitrate representation of the video component, corresponding scaled SOG coordinate information and the encoded audio stream are multiplexed together whereby a plurality of multiplexed media outputs may be generated for distribution to one or more subscriber stations. In an example implementation, the SOG coordinate information may presented in one or more Supplemental Enhancement Information (SEI) messages where MPEG-2 Transport Stream (M2TS) container format is used for the plurality of multiplexed media outputs. In another variation, the SOG coordinate information may presented in one or more user data (udat) atoms where MPEG-4 part 14 (MP4) container format is used for the plurality of multiplexed media outputs.

In another aspect, an embodiment of a media processing method operative at a client device is disclosed. The claimed embodiment includes, inter alia, receiving a multiplexed media stream containing an encoded video component, an encoded audio component and SOG coordinate information for still areas in the encoded video component, wherein the encoded video component may comprise a particular bitrate representation of a video component received at a media source node and processed thereat for ABR streaming. A de-multiplexing operation is effectuated for separating the encoded video component, the encoded audio component and the SOG coordinate information from the multiplexed media stream. Thereafter, the encoded audio component may be decoded to generate a decoded audio stream and the encoded video component may be decoded to generate a decoded video stream. The decoded video stream, the SOG coordinate information, timing information, and quantization parameter (QP) information extracted from the decoded video stream may be provided to an adaptive filtering mechanism that is operative for selecting and applying a suitable post-decode filter (PDF) for pixels of the decoded video stream based on the SOG coordinate information to generate a filtered video stream. The decoded audio stream and the filtered video stream may be synchronized based on the timing information, whereupon the synchronized audio and video streams may be provided to respective audio and video renderers for presentation at the client device. In additional or alternative embodiments, a post-decode filter may be selected at a client device responsive to various selection criteria comprising at least one of: QP information, particular bitrate representation of the video component, screen size of a display associated with the client device, video quality and/or complexity of the received video component, frame image resolution, codec resolution used at the media source node, image upscaling used at the client device, image downscaling used at the client device, display screen renderer resolution, Mean Opinion Score (MOS) estimation of the received video component, Peak Signal-to-Noise Ratio (PSNR), Structural Similarity (SSIM) index, Mean Square Error (MSE), PSNR-HVS-M (Human Visual System), and Multi-scale SSIM of the received video component, among others.

In a further aspect, an embodiment of a system, apparatus, or network element is disclosed which comprises, inter alia, suitable hardware such as processors and persistent memory having program instructions for executing an embodiment of the methods set forth herein.

In still further aspects, one or more embodiments of a non-transitory computer-readable medium or distributed media containing computer-executable program instructions or code portions stored thereon are disclosed for performing one or more embodiments of the methods of the present invention when executed by a processor entity of a network node, apparatus, system, network element, subscriber device, and the like, mutatis mutandis. Further features of the various embodiments are as claimed in the dependent claims.

A primary benefit of the present invention is to provide advance signaling of still areas/objects in an incoming video, which signifies to a client device potential areas or regions whose picture quality may be improved by intelligent selection of an adaptively designed post-decode filter at the device side. The overall quality of viewing experience of the end user is thereby enhanced because of amelioration of the artifacts created in accounting for high motion content at source processing.

Additional benefits and advantages of the embodiments will be apparent in view of the following description and accompanying Figures.

BRIEF DESCRIPTION OF THE DRAWINGS

Embodiments of the present disclosure are illustrated by way of example, and not by way of limitation, in the Figures of the accompanying drawings in which like references indicate similar elements. It should be noted that different references to "an" or "one" embodiment in this disclosure are not necessarily to the same embodiment, and such references may mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

The accompanying drawings are incorporated into and form a part of the specification to illustrate one or more exemplary embodiments of the present disclosure. Various advantages and features of the disclosure will be understood from the following Detailed Description taken in connection with the appended claims and with reference to the attached drawing Figures in which:

DETAILED DESCRIPTION

Figure 1:
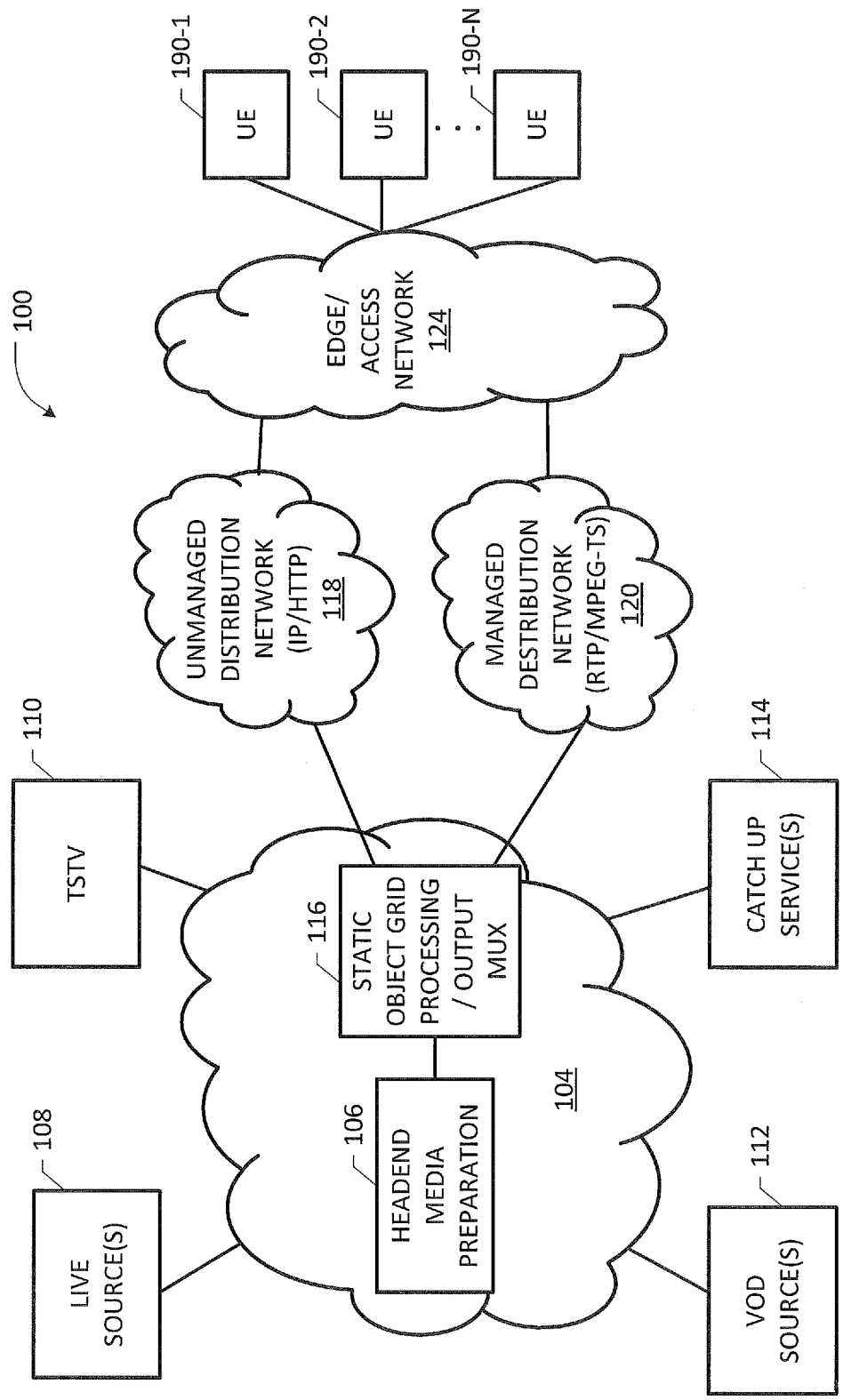
FIG. 1 depicts a generalized example network environment wherein one or more embodiments of the present invention may be practiced for facilitating adaptive post-decode filtering for media distributed over a variety of network configurations.

In the description herein for embodiments of the present invention, numerous specific details are provided, such as examples of components and/or methods, to provide a thorough understanding of embodiments of the present invention. One skilled in the relevant art will recognize, however, that an embodiment of the invention can be practiced without one or more of the specific details, or with other apparatus, systems, assemblies, methods, components, materials, parts, and/or the like. In other instances, well-known structures, materials, or operations are not specifically shown or described in detail to avoid obscuring aspects of embodiments of the present invention. Accordingly, it will be appreciated by one skilled in the art that the embodiments of the present disclosure may be practiced without such specific components. It should be further recognized that those of ordinary skill in the art, with the aid of the Detailed Description set forth herein and taking reference to the accompanying drawings, will be able to make and use one or more embodiments without undue experimentation.

Additionally, terms such as "coupled" and "connected," along with their derivatives, may be used in the following description, claims, or both. It should be understood that these terms are not necessarily intended as synonyms for each other. "Coupled" may be used to indicate that two or more elements, which may or may not be in direct physical or electrical contact with each other, co-operate or interact with each other. "Connected" may be used to indicate the establishment of communication, i.e., a communicative relationship, between two or more elements that are coupled with each other. Further, in one or more example embodiments set forth herein, generally speaking, an element, component or module may be configured to perform a function if the element may be programmed for performing or otherwise structurally arranged to perform that function.

As used herein, a network element, node or subsystem may be comprised of one or more pieces of service network equipment, including hardware and software that communicatively interconnects other equipment on a network (e.g., other network elements, end stations, IP-STBs, legacy STBs, etc.), and is adapted to host one or more applications or services, either in a virtualized or non-virtualized environment, with respect to a plurality of subscribers and associated user equipment (UE) nodes that are operative to receive/consume content in a media streaming network where media content assets may be distributed and delivered using stream-based or file-based mechanisms. As such, some network elements may be disposed in a wireless radio network environment whereas other network elements may be disposed in a public packet-switched network infrastructure, including or otherwise involving suitable content delivery network (CDN) infrastructure that may comprise public, private, or mixed CDNs. Further, suitable network elements including one or more embodiments set forth herein may involve terrestrial and/or satellite broadband delivery infrastructures, e.g., a Digital Subscriber Line (DSL) network architecture, a Data Over Cable Service Interface Specification (DOCSIS)-compliant Cable Modem Termination System (CMTS) architecture, switched digital video (SDV) network architecture, a Hybrid Fiber-Coaxial (HFC) network architecture, a suitable satellite access network architecture or a broadband wireless access network architecture over cellular and/or WiFi connectivity. Accordingly, some network elements may comprise "multiple services network elements" that provide support for multiple network-based functions (e.g., A/V media delivery policy management, session control, QoS policy enforcement, bandwidth scheduling management, content provider priority policy management, streaming policy management, and the like), in addition to providing support for multiple application services (e.g., data and multimedia applications). Example subscriber end stations or client devices may comprise various streaming-capable devices that may consume or deliver media content assets using streaming and/or file-based downloading technologies, which may involve some type of rate adaptation in certain embodiments. Illustrative client devices or UE devices may therefore include any device configured to execute, inter alia, one or more streaming client applications for receiving, recording, storing, and/or rendering content, live media and/or static/on-demand media, from one or more content providers, e.g., via a broadband access network, in accordance with one or more file-based ABR streaming technologies such as, e.g., Microsoft® Silverlight® Smooth Streaming (HSS), HTTP streaming (for instance, Dynamic Adaptive Streaming over HTTP or DASH, HTTP Live Streaming or HLS, HTTP Dynamic Streaming or HDS, etc.), Icecast, and so on, as well as MPEG Transport Stream-based streaming over Real-time Transfer Protocol (RTP) networks or multicast/unicast ABR networks. Accordingly, such client devices may include legacy set-top boxes (STBs), Next Generation IP-based STBs, networked TVs, personal/digital video recorders (PVR/DVRs), networked media projectors, portable laptops, netbooks, palm tops, tablets, smartphones, multimedia/video phones, mobile/wireless user equipment, portable media players, portable gaming systems or consoles (such as the Wii®, Play Station 3®, etc.) and the like, which may access or consume content/services provided via a suitable media distribution network wherein video still area or static object information in incoming source media streams may be signaled from a media server or source processing node in accordance with to one or more embodiments set forth herein.

One or more embodiments of the present patent disclosure may be implemented using different combinations of software, firmware, and/or hardware. Thus, one or more of the techniques shown in the Figures (e.g., flowcharts) may be implemented using code and data stored and executed on one or more electronic devices or nodes (e.g., a subscriber client device or end station, a network element, etc.). Such electronic devices may store and communicate (internally and/or with other electronic devices over a network) code and data using computer-readable media, such as non-transitory computer-readable storage media (e.g., magnetic disks, optical disks, random access memory, read-only memory, flash memory devices, phase-change memory, etc.), transitory computer-readable transmission media (e.g., electrical, optical, acoustical or other form of propagated signals—such as carrier waves, infrared signals, digital signals), etc. In addition, such network elements may typically include a set of one or more processors coupled to one or more other components, such as one or more storage devices (e.g., non-transitory machine-readable storage media) as well as storage database(s), user input/output devices (e.g., a keyboard, a touch screen, a pointing device, and/or a display), and network connections for effectuating signaling and/or bearer media transmission. The coupling of the set of processors and other components may be typically through one or more buses and bridges (also termed as bus controllers), arranged in any known (e.g., symmetric/shared multiprocessing) or heretofore unknown architectures. Thus, the storage device or component of a given electronic device or network element may be configured to store code and/or data for execution on one or more processors of that element, node or electronic device for purposes of implementing one or more techniques of the present disclosure.

Referring now to the drawings and more particularly to FIG. 1, depicted therein is an example streaming network environment 100 wherein one or more embodiments of the present invention may be practiced for facilitating adaptive post-decode (APD) filtering for media distributed and delivered over a variety of networks and associated technologies according to the teachings set forth herein. It will be realized that one or more embodiments set forth herein may be advantageously practiced in combination with suitable bandwidth management techniques, delivery optimization methodologies, etc., for example, responsive to a client's video buffer characteristics, client device/display characteristics and configurations, network/connection conditions, and the like, although it is not necessary that all such features be included in a particular embodiment. In general, the terms "media content," "media asset" or "content file" (or, simply "content" or terms of similar import) as used herein may include live media digital assets or program assets, although the teachings herein are not necessarily limited thereto. Accordingly, a content program may be any type of A/V content that may be delivered using adaptive bitrate encoding/transcoding and streaming, e.g., live capture media or static/stored on-demand media, such as IPTV programs, Over-The-Top (OTT) and Video-On-Demand (VOD) or Movie-On-Demand (MOD) shows or programs, time-shifted TV (TSTV) content, etc., as exemplified by one or more live sources 108, one or more TSTV sources 110, one or more VOD sources 112 and one or more catch up services 114. Additionally, media content may also comprise or be further augmented by secondary content such as advertisement channels as well as virtual reality (VR) and/or augmented reality (AR) content in certain embodiments of the present disclosure.

A media source network or content source network 104 comprising a suitable media preparation infrastructure 106 as well as static object grid (SOG) processing infrastructure 116 is operative to receive media inputs from various sources and process the video component of an incoming source media input for signaling SOG information relating to still areas or low motion areas of the video to a receiving station as will be set forth in additional detail hereinbelow. In general, the processed media may be distributed using unmanaged networks, managed networks, and/or federated network portions, or in any combination thereof, using a variety of distribution technologies, protocols, formats and/or containerization schemes. By way of illustration, without any limitation, an example unmanaged distribution network architecture 118 may involve IP/HTTP-based streaming while an example managed distribution network architecture 120 may involve MPEG Transport Scheme (TS)-based streaming over Real-time Transfer Protocol (RTP), which are in turn coupled to various types of edge networks and access networks, cumulatively referred to by reference numeral 124, that may interface to client devices, STBs, etc. via gateway/premises nodes, and the like, generally referred to as UE nodes 190-1 to 190-N, for facilitating media delivery using applicable transmission technologies.

One skilled in the art will recognize that whereas "distribution" may be generally used to describe the provisioning of media within the core network and out to the edge servers, "delivery" of the media takes place between the edge server and the client, although such terms may be somewhat interchangeably used in the context of one or more embodiments of the present application. Further, content may be distributed and/or delivered using either multicast techniques or unicast techniques in certain embodiments involving managed/federated network architectures. In a unicast mechanism, a subscribing receiver may be provided with a direct and unique two-way path through the delivery network all the way back to a serving media server supplying the required data stream. The main streaming activity is managed on a one-to-one basis between the receiver and the source server in a communication session. The network between the source server and receiver may typically comprise a series of intermediate servers installed at network nodes, which may not be directly involved in the service but only support the transfer of a packet stream. Typically, the protocols used to support the transmissions may comprise simple forms of Internet Protocol (IP) itself augmented by one or more higher layer protocols to provide flow control. These protocols extend across the span of the network connection between the source server and a given receiver.

A unicast system can support ABR streaming, which allows some form of rate adaptation. A given service may be encoded at a selection of different bitrates (known as representations or ABR video quality, as noted elsewhere in the present application), with synchronised boundary points at defined locations (e.g., every 50 frames). For each representation, content between successive boundary points is converted into a discrete file. Clients fetch a segment of one of the representations in turn. If a higher or a lower bit rate is required, the next segment is fetched from one of the other representations. The segments are constructed such that there is no discontinuity in decoded pictures/audio if the client switches between representations at the boundary points. This system may require a unicast two-way path between source and receiver to request files and deliver the requested files.

Multicast distribution/delivery makes more efficient use of bandwidth by sharing content streams among several receivers. Intermediate network elements (e.g., routers or switches) are now more closely involved in the service delivery such that some control and management functions are delegated from the source server. This control is supported by more extensive protocols devised for this type of application such as, e.g., Protocol Independent Multicast (PIM), Internet Group Multicast Protocol (IGMP), RTP/MPEG-TS over UDP and IP multicast for stream-based multicast, NACK-Oriented Reliable Multicast or NORM, etc. When a receiver requests a given media item or asset, the network router system finds an existing stream of that content already in the network and directs a copy of it to that receiver from a serving cable headend, a video head office or an appropriately proximal network node in an edge distribution network. That is, multicast can be all the way from a headend (e.g., at a national data center comprising nodes 106/116) to home network node edge media node and/or STB. The requesting receiver may be provided with the capability to join this existing stream under controlled conditions that do not adversely affect existing receivers. Any receiver in this group may also be provided with the ability to leave the stream, or pause its consumption, without affecting the others. Additionally, there may be an implementation where a video pipe delivering services to a premises is operative to deliver content to one or more progressive download clients of the premises that are designed to receive the video in bursts in a file-based mechanism.

Figure 2A:
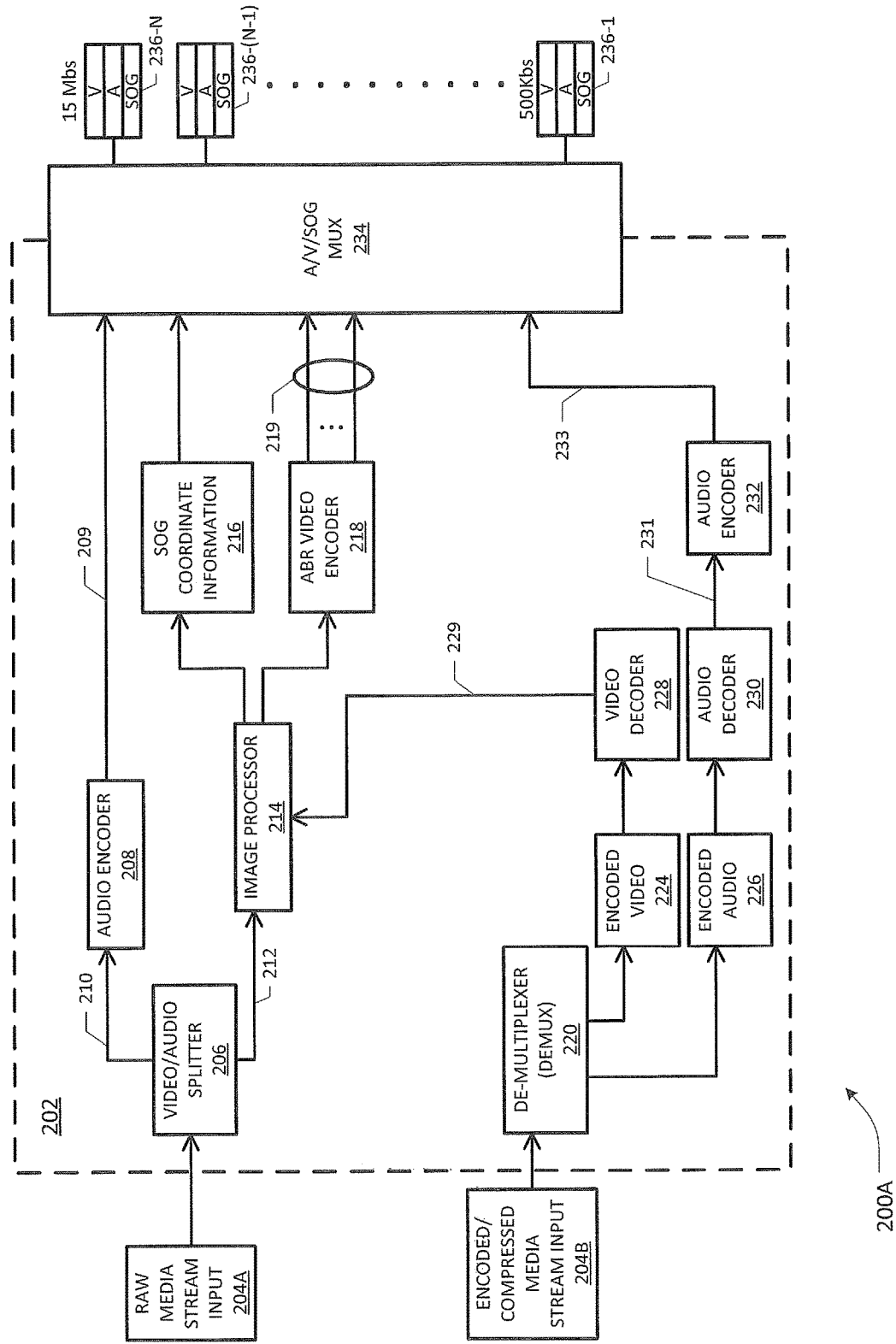
FIG. 2A depicts a block diagram of a media source system operative to provide multiplexed media to a variety of distribution networks wherein static/still area information in video images may be signaled according to an example embodiment.
Figure 2B:
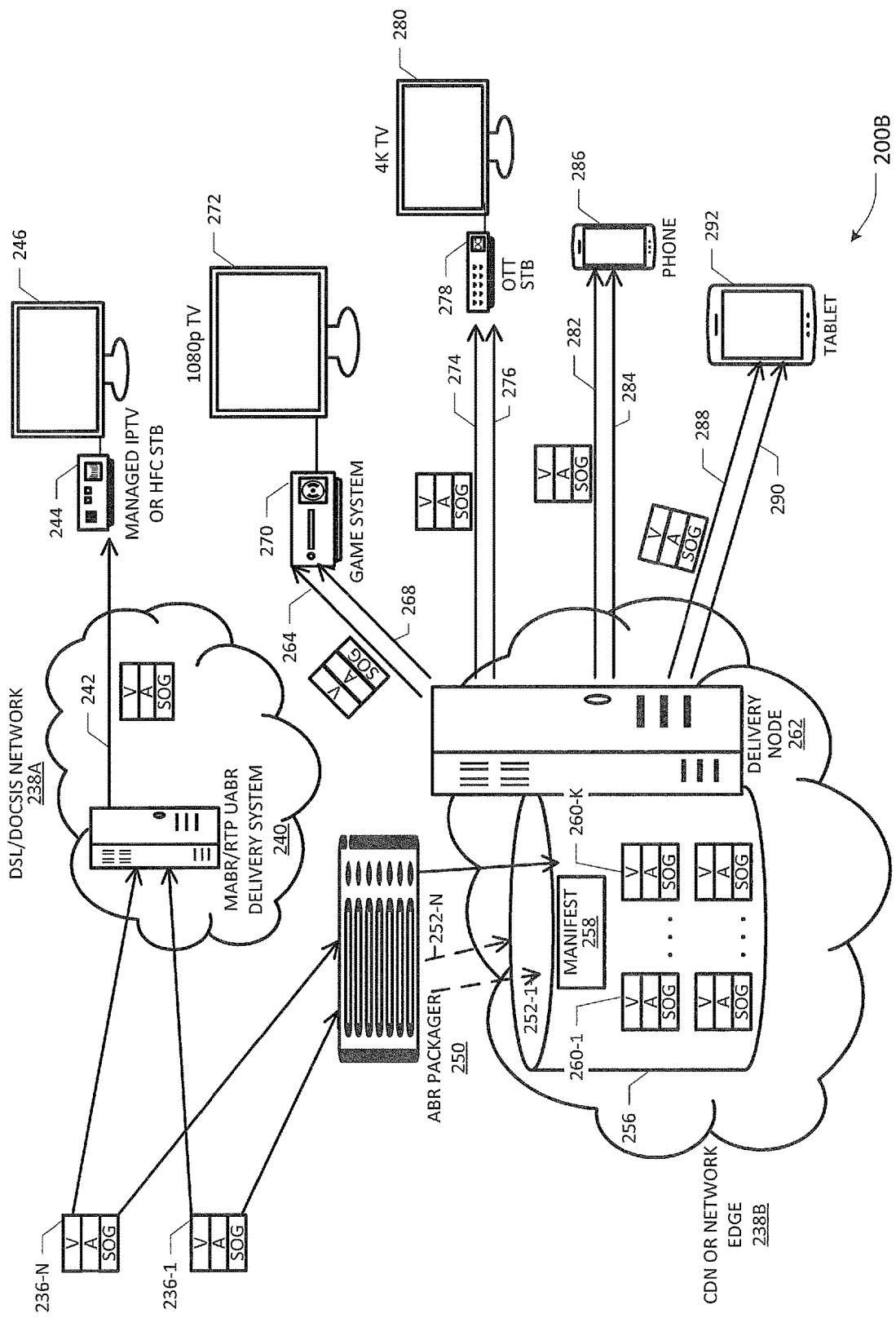
FIG. 2B depicts example distribution network architectures operative with the media source system of FIG. 2A wherein the example distribution network architectures illustrate additional elements that may be configured within the network environment of FIG. 1.

Attention is now drawn to FIGS. 2A and 2B that cumulatively exemplify additional details of an example implementation of the foregoing network environment for purposes of the present patent disclosure. In particular, FIG. 2A depicts a block diagram of a media source system 200A operative as media preparation and SOG processing infrastructure 106/116 to provide multiplexed media to a variety of distribution networks wherein temporary static area/object grid (SAG/SOG) information with respect to incoming video images may be signaled according to an example embodiment. It will be realized that the terms "still areas", "still objects", "static areas", or "static objects", and terms of such import with respect to video images are used roughly synonymously and interchangeably throughout the present patent disclosure and the presence of one term is generally inclusive of the remaining terms of similar import unless otherwise noted. FIG. 2B exemplifies a portion 200B that represents certain aspects of the generalized network environment 100 wherein example distribution network architectures 238A, 238B are operative with the media source system of FIG. 2A for distributing SOG-multiplexed media to various UE devices respectively served thereby.

Broadly, an embodiment involving the media source system 200A and the distribution architecture 200B may be configured such that an ABR encoder is operative to identify the still areas or static objects of the video component from the raw video stream. Appropriate logic executing at the media source system 200A is operative to multiplex the static area grid information relating to these areas as suitable messages that can be combined with encoded audio and video streams. As the video component may be encoded at different bitrates, multiple bitrate representations of the video content are correspondingly multiplexed with suitably scaled static area grid information, thereby resulting in multiple streams of the multiplexed (i.e., "muxed") media, which are distributed to the edge networks. At the device side, a device decoder may be configured to de-multiplex (i.e., "demux") a received media stream and extract the static area grid information, which may be used in combination with a number of additional pieces of information to adaptively select a post-decode (PD) filter that may be applied to the still areas of the decoded video in order to mitigate the negative effects associated with conventional source video processing as noted in the Background section of the present patent application. Additional details relating to the foregoing teachings are set forth immediately below.

Depending on architectural configuration, the media source system 200A may include a computer-implemented platform, apparatus, node or element 202 that can receive a variety of incoming source media inputs, e.g., live or VOD, whose video content may already be encoded and/or compressed using known source encoding/compression or codec technologies, techniques and protocols, etc., such as, e.g., without limitation, H.264 or MPEG-4 Part 10, Advanced Video Coding (MPEG-4 AVC), High Efficiency Video Coding (HEVC) or H.265 (MPEG-H Part 2), and the like. Additionally or alternatively, some of the incoming source media inputs may comprise uncompressed or raw audio and video streams from source feeds, e.g., without limitation, high definition serial digital interface (SDI) feeds of 270 Megabits per second (Mbs), 540 Mbs, etc. By way of illustration, raw media source inputs 204A and encoded/compressed media source inputs 204B are exemplified in FIG. 2A, which may be processed somewhat differently for extracting still area/static object grid (SAG/SOG) information in the respective videos according to an example embodiment.

An example embodiment of the media server/source system 200A operatively associated with the network 104 (shown in FIG. 1) may therefore be configured, e.g., as a global headend, to accept media content from live sources and/or static file sources, e.g., online content providers such as Hulu®, Netflix®, YouTube®, or Amazon® Prime, as well as VOD catalog or content providers or studios such as, e.g., Disney, Warner, Sony, etc. Media content from live sources may comprise live programming captured relative to any type of event, e.g., sporting/entertainment/gaming events, concerts, live TV shows, live news broadcasting sources, such as, for instance, national broadcasters (e.g., NBC, ABC, etc.) as well as cable broadcaster channels like Time Warner channels of CNN, ESPN, CNBC, etc., and local broadcasters, etc., including any secondary media insertions such as advertisement media channels.

Where raw source media input streams 204A are received, a video/audio media splitter 206 may be configured to split or separate the media into a raw audio component 210 and a raw video component 212. A suitable audio encoder 208 may be provided to encode the raw audio component 210 into an encoded audio stream 209, which may be provided to a multiplexer 234. The raw video component 212 may be provided to an image processor 214 operating according to the teachings herein to determine SAG/SAG coordinate information 216, as will be set forth in additional detail further below, which is also provided to the multiplexer 234. The video component is also provided to an ABR video encoder 218 for generating multiple versions of the video content encoded at different bitrates corresponding to varying levels of video quality, referred to as multi-bitrate representations 219, that are provided to the multiplexer 234.

A similar process may also be employed where encoded/compressed media input streams 204B are received at the media server system 202, although encoded media is first de-multiplexed or otherwise separated into encoded video and encoded audio components 224, 226, respectively, by a de-multiplexer 220. In one embodiment, the separated or de-muxed encoded video and audio components 224/226 are provided to respective video and audio decoders 228, 230, which generate corresponding decoded video 229 and decoded audio 231. Thereafter, the decoded video component 229 may be provided to the image processor 214 for processing in a manner similar to that of the video component 212 to generate applicable SOG coordinate information 216. Likewise, the decoded video component 229 may also be encoded by the ABR encoder 218 to generate multiple bitrate representations 219 of the same incoming video content. Furthermore, the decoded audio component 231 may be encoded by a suitable encoder 232 to generate encoded audio stream 233 that is provided the multiplexer 234.

Skilled artisans will recognize that regardless of whether raw or compressed media stream input is received by the media server node 202, encoded audio components 209, 233 provided to the multiplexer 234 may be generated by a variety of audio encoding schemes known in the art, including but not limited to, e.g., audio formats such as MP3, AAC, AAC+, eAAC+, FLAC WMA, WAV, AMR, OGG, AC3, LPCM and MIDI, etc. In one example embodiment, MUX 234 may be configured to multiplex each bitrate representation of the encoded video component with a corresponding SOG coordinate message as well as the encoded audio stream in order to generate a plurality of multiplexed media outputs 236-1 to 236-N, each having a different level of video bitrate quality. By way of illustration, muxed media output 236-N is representative of an HD profile or version of the video encoded at 15 Mbs (for 4K quality or resolution, where "V" is representative of the video component, "A" is representative of the audio component, and "SOG" is representative of the extracted still area grid information. Likewise, muxed media output 236-1 is illustrative of a low quality profile or version of the video encoded at 500 Kbs (for 480×360 resolution). In order to facilitate proper decoding at a downstream receiving node (e.g., an STB or an end user device), applicable timing information is also included in the multiplexed media outputs 236-1 to 236-N, wherein example timing reference points may comprise, but not limited to, stream access point (SAP) information, random access point (RAP) information, presentation timestamps (PTS), decoding timestamps (DTS), program clock references (PCR), system clock references (SCR), and the like.

With respect to facilitating the media for distribution, MUX 234 may be configured in one example embodiment to interface with a containerization module operative to containerize each of the plurality of multiplexed media outputs 236-1 to 236-N in a format adapted for distribution using MPEG-2 Transport Stream container format (M2TS; also referred to as MP2TS sometimes), MPEG 4 part 14 (MP4) container format, or ISO Base Media File Format (ISOBMFF) container format, and the like. Depending on the type of containerization, the SOG information may be provided in a suitable signaling mechanism for multiplexing within the muxed media outputs 236-1 to 236-N. For example, in one embodiment, the SOG coordinate information may be presented in one or more Supplemental Enhancement Information (SEI) messages depending on where MPEG-2 Transport Stream (M2TS) containerization format is used. In another arrangement, the SOG coordinate information may be presented in one or more user data (udat) atoms depending on where MPEG-4 part 14 (MP4) container format is used for the plurality of multiplexed media outputs 236-1 to 236-N.

Taking reference to FIG. 2B, an example distribution architecture 200B may comprise a DSL/DOCSIS network portion 238A having suitable MABR/UABR/RTP infrastructure 240 (which may include, e.g., IGMP nodes, routers, DSLAM/CMTS elements, etc.) that receives each of the multiplexed media outputs 236-1 to 236-N. In one example arrangement, DSL/DOCSIS network portion 238A may be configured to multicast requested media channels via M2TS or MP4 container formats, although other formats may also be used in additional or alternative arrangements. Skilled artisans will recognize that the overall distribution/delivery infrastructure 240 may be configured to join a channel 242 at suitable quality (e.g., 4K MABR channel) requested by a managed IPTV or HFC STB element 244 coupled to a display device 246 of a subscriber premises. In an additional or alternative arrangement, the multiplexed media outputs 236-1 to 236-N may also be provided to an ABR packager/segmentation node 250 for segmenting each multiplexed media output into a segmented stream adapted for distribution via a CDN infrastructure using a suitable ABR streaming protocol over HTTP. In general operation, segmentation/packager 250 is operative to divide each version of the encoded media content into fixed duration segments or chunks, which may be between two and ten seconds in duration, thereby generating a plurality of chunk streams 252-1 to 252-N, which may be provided to a database 256 of an origin server or CDN edge delivery node 262. One skilled in the art will recognize that shorter segments may reduce coding efficiency whereas larger segments may impact the adaptability to changes in network throughput and/or fast changing client behavior. Regardless of the chunk size, the segments may be Group-of-Pictures (GOP)-aligned such that all encoding profiles or representations have the same media segment data with properly aligned timing boundaries. In general, a GOP may include at least one Instantaneous Decoder Refresh (IDR) frame (a special kind of I-frame, also known as a key frame). The segmenter/packager node may be configured to make content available only when all frames (video pictures and/or audio samples) for a fragment or segment have been completely received from the live source. A GOP may be provided as a coded sequence of video pictures between two key frames (e.g., IDR frames), separated by one or more P-frames and/or B-frames.

One or more suitable metadata files referred to as manifest files are created that describe the encoding rates and Uniform Resource Locator (URL) pointers for the various segments of encoded content. In some embodiments, hierarchically organized manifest files may be provided, e.g., a master manifest file containing one or more child manifests. By way of illustration, muxed media segments 260-1 to 260-K and stored manifests 258 associated therewith for each muxed media output are exemplified with respect to delivery node 262 operative to serve a plurality of client devices that can request different bitrate segments based on adaptive control. As noted previously, ABR streaming protocols may correspond to a variety of technologies, e.g., HSS, HAS, HLS, MEPG DASH, HDS, etc., that can interoperate with different types of source video codecs, source audio codecs, package/segment container formats, file storage formats, encryption schemes, etc. A gaming system 270 with associated display device 272 for rendering media is operative to request and receive muxed media segments 264 responsive to associated manifest 268, which is exemplary of a high quality bitrate streaming UE node. Likewise, an OTT STB 278 with associated display device 280 is exemplary of another high quality bitrate streaming UE device that may be configured to receive suitable muxed media segments 274 and associated manifest files 276 according to applicable streaming technologies. Smartphone 286 receiving muxed media segments 282 and associated manifest files 284 and tablet/phablet 292 receiving muxed media segments 288 and associated manifest files 290 are similarly illustrative of lower quality bitrate streaming UE devices served by the delivery node 262, wherein each UE device may be configured to execute adaptive filtering at a post-decode stage in an advantageous manner as will be set forth in additional detail further below.

Figure 3:
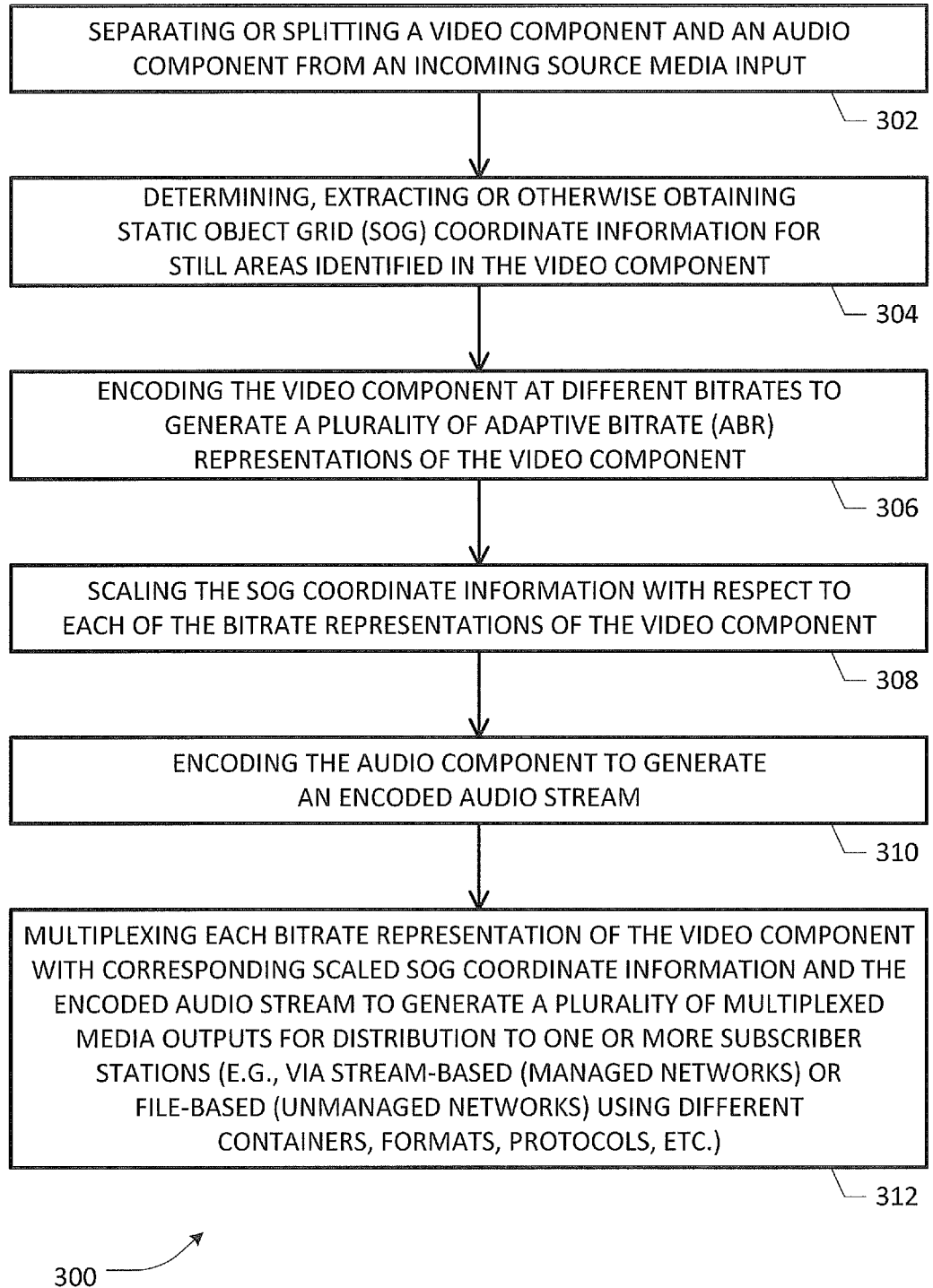
FIG. 3 is a flowchart illustrative of various blocks, steps and/or acts of a media processing method that may be (re)combined in one or more arrangements, with or without blocks, steps and/or acts of additional flowcharts of the present disclosure, for processing an incoming source media input at a media source system according to one or more embodiments of the present invention.

FIG. 3 is a flowchart illustrative of various blocks, steps and/or acts of a media processing method 300 that may be (re)combined in one or more arrangements, with or without blocks, steps and/or acts of additional flowcharts of the present disclosure, for processing an incoming source media input at a media source system according to one or more embodiments of the present invention. At block 302, a video component and an audio component may be split, de-muxed, or separated from an incoming source media input. At block 304, SOG coordinate information for one or more still areas identified in the video component may be extracted, determined or otherwise obtained. The video component may be encoded at different bitrates to generate a plurality of ABR representations of the video component as set forth at block 306. The SOG coordinate information may be scaled with respect to each of the bitrate representations of the video component (block 308). An audio component of the incoming source media input stream may be encoded in a suitable format to generate an encoded audio stream (block 310). Thereafter, each bitrate representation of the video component may be multiplexed with corresponding scaled SOG coordinate information and the encoded audio stream to generate a plurality of multiplexed media outputs for distribution to one or more subscriber stations (e.g., via stream-based (managed networks) or file-based (unmanaged networks) using different containers, formats, protocols, etc.), as set forth at block 312.

Figure 4A:
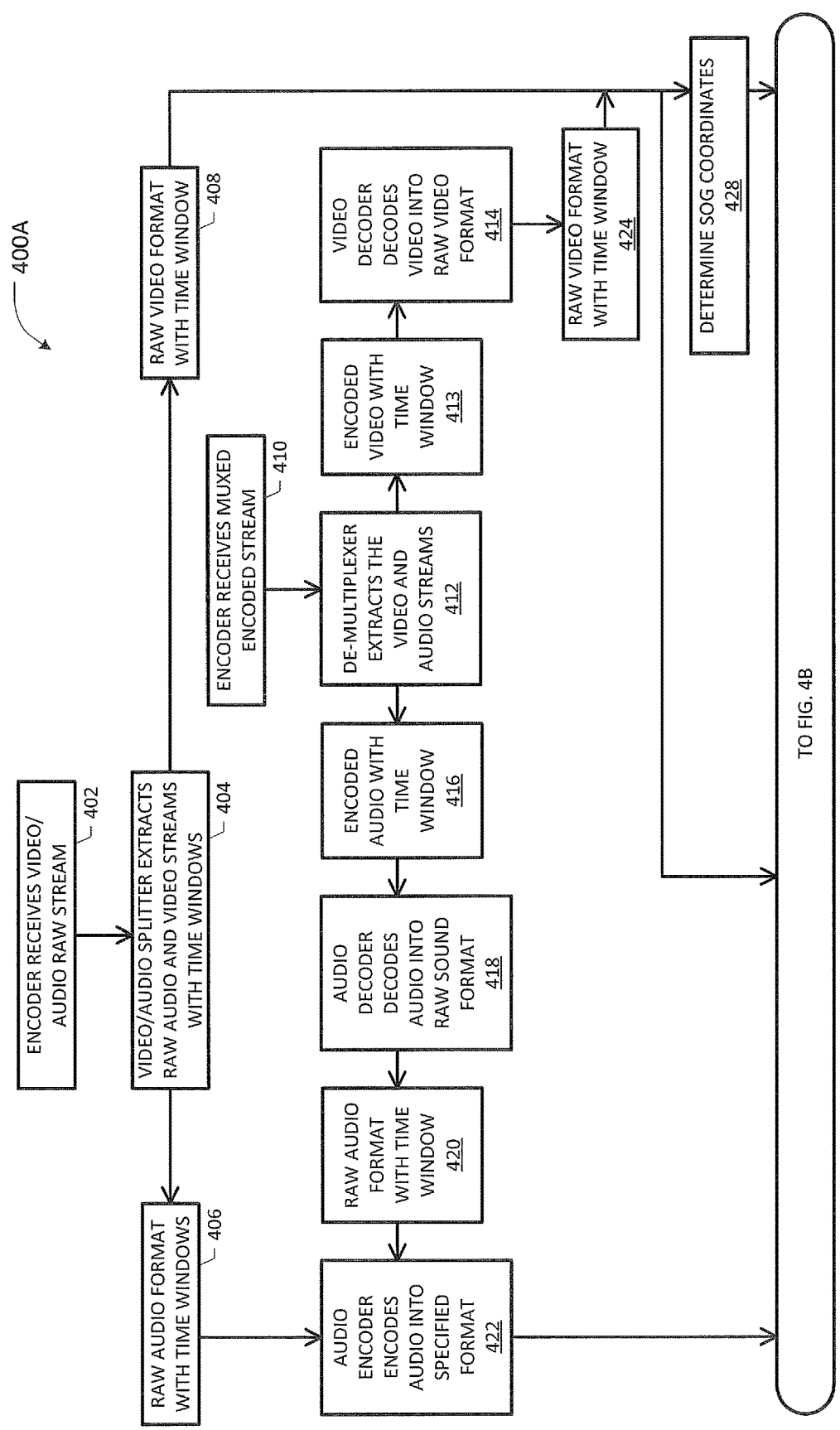
FIGS. 4A and 4B depict portions of a flowchart illustrative of a media processing method including additional details according to an embodiment of the present invention.
Figure 4B:
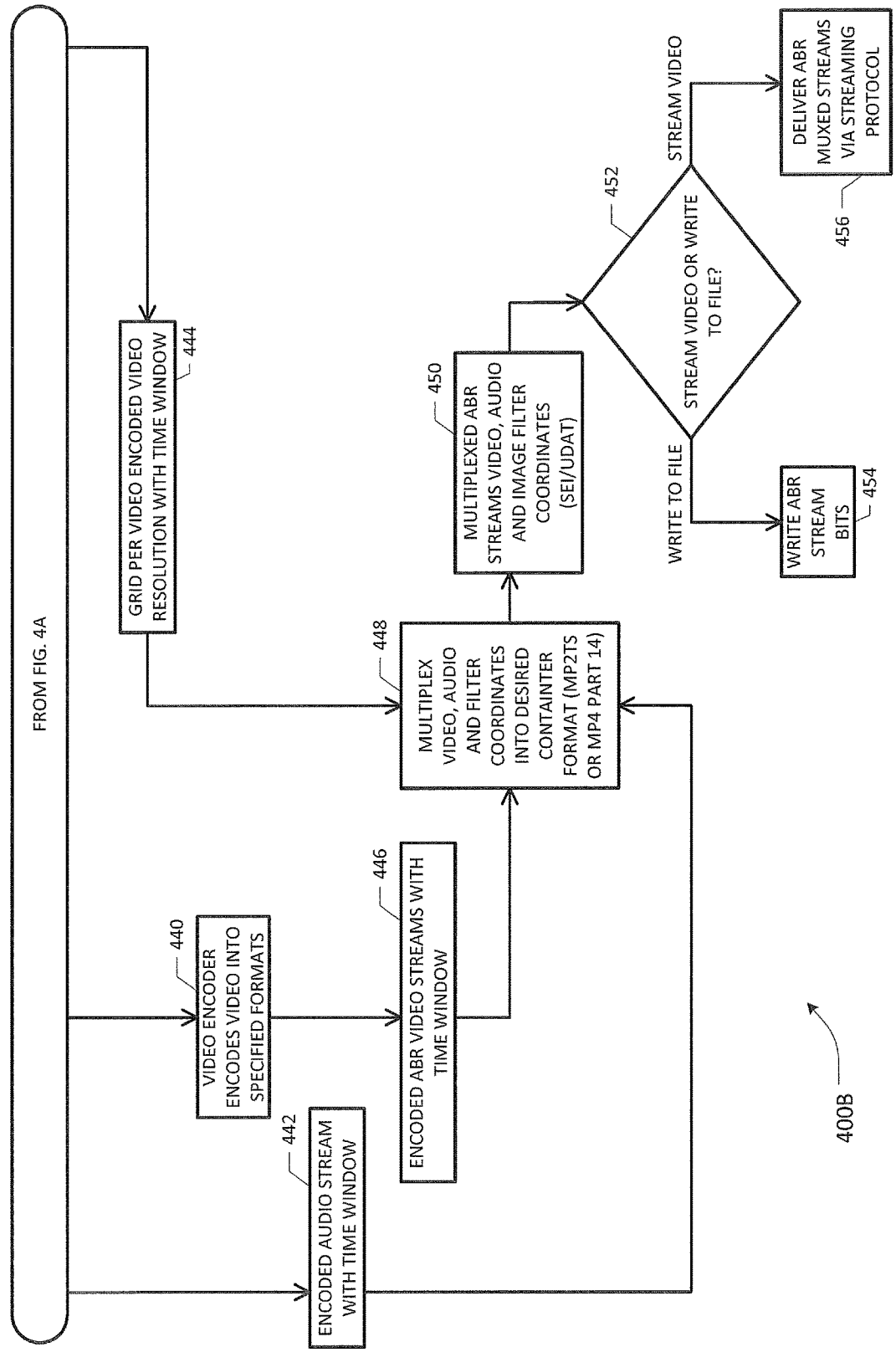

FIGS. 4A and 4B depict portions of a flowchart illustrative of a media processing method 400A/400B at a media server/source system that includes additional details according to an embodiment of the present invention. As noted previously, video image processing with respect to an incoming media stream may vary depending on whether it is already in an encoded/compressed form. Accordingly, two entry points into the process flow portion 400A are illustrated, with an encoder receiving raw video and audio streams at block 402 and a transcoding encoder receiving muxed encoded video/audio stream at block 410. At block 404, raw video and audio streams are separated or extracted along with time windows, such as PTS/DTS, etc., as illustrated by blocks 408 and 406. Extracted raw video stream with timing window information from block 408 is provided to a static/still area grid (SAG) or static object grid (SOG) coordinate extraction process at block 428, which is further described in relation to FIG. 5 below. Extracted raw audio stream with applicable timing window information from block 406 is encoded by an audio encoder into a specified format (block 422).

On the other hand, where a transcoder portion is involved in the process, a de-multiplexer first separates the encoded video and audio streams of the incoming muxed encoded media (at block 412) along with the timing window information, which are provided to respective branches for subsequent processing. Encoded video with applicable timing window information from block 413 is provided to a decoder that decodes the video into "raw" video stream (at block 414), whereupon the raw video stream with timing window information from block 424 is provided the SAG/SOG extraction process 428 as before. Encoded audio with timing window information from block 416 is provided to an audio decoder that decodes the de-muxed audio into "raw" sound format (block 418), whereupon the raw audio stream with timing window information from block 420 is provided to an audio encoder for encoding it into a specified format (block 422). Skilled artisans will recognize that numerous variations with respect to the audio portion of an encoded/compressed source media input may be provided, including selectively applying suitable audio formats and/or bypassing audio decoding altogether in some embodiments.

In process flow portion 400B, video with timing window information from block 408 or block 424 is provided to an encoder for encoding the video into multiple bitrate formats or representations at different quality levels (block 440) to generate a plurality of ABR video streams with timing windows at set forth in block 446. Encoded audio stream with timing window information from block 442, SAG/SOG coordinate information per encoded bitrate resolution with timing window information from block 444, as well as ABR video streams with timing window information from block 446 are multiplexed together into desired container formats (block 448) to generate multiplexed ABR streams including SAG/SOG coordinates in suitable signaling (SEI messages or udat atoms) as set forth at block 450. Depending on implementation requirements, the muxed ABR streams may be delivered to a distribution network or stored to a file storage system, as set forth at blocks 452, 454 and 456.

Figure 5:
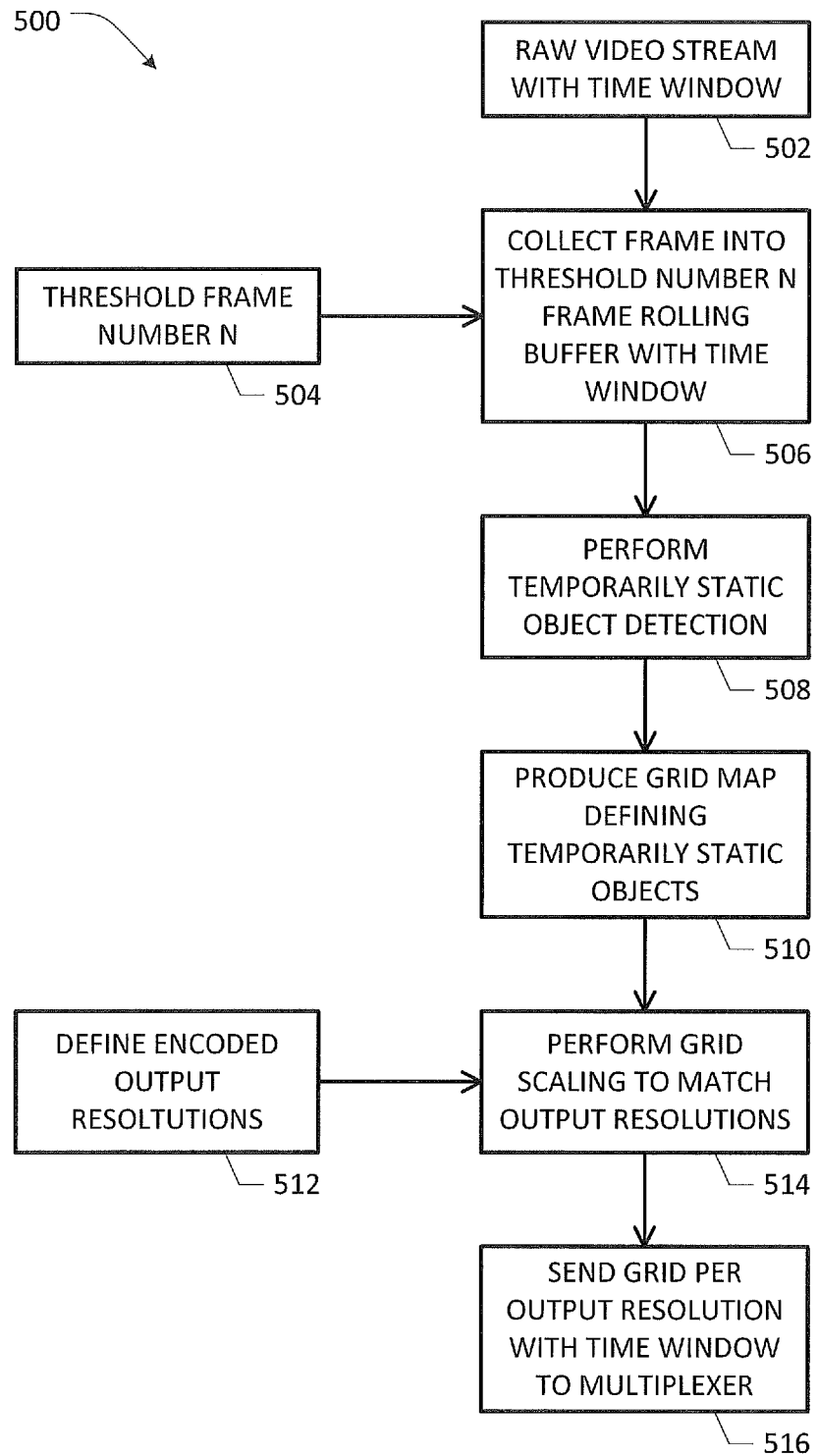
FIG. 5 is a flowchart illustrative of various blocks, steps and/or acts of a media processing method that may be (re)combined in one or more arrangements, with or without blocks, steps and/or acts of additional flowcharts of the present disclosure, for determining static areas/objects in incoming video as part of media processing at a media source system according to one or more embodiments of the present invention.

FIG. 5 is a flowchart illustrative of various blocks, steps and/or acts of a media image processing method 500 that may be (re)combined in one or more arrangements, with or without blocks, steps and/or acts of additional flowcharts of the present disclosure, for determining static areas (also referred to as static objects) in incoming video as part of media processing at a media source system according to one or more embodiments of the present invention. At block 502, a raw video stream with timing window information is provided as an input to process flow 500, which also receives a configurable number of video frames (e.g., N frames as set forth at block 504) that may be analyzed for determining the presence of static areas therein. As set forth hereinabove, the raw video stream in the context of the present invention may be a direct source feed that is uncompressed or may be obtained as a video stream that has been de-multiplexed and decoded from a compressed source video input. At block 506, the frames may be collected into a frame-rolling buffer, which is presented to a SOG/SAG determination technique (block 508). Skilled artisans will recognize that a number of techniques may be employed for determining SOG/SAG coordinates in the image frames of a video sequence. In one example embodiment, identification and modeling of static objects may be integrated with a suitable background modeling technique such as, e.g., a Gaussian Mixture Model (GMM) technique wherein the background, moving objects and static objects/areas may each be modeled by respective distributions. In general, "staticness" may refer to an amount or degree that a tracked bounding box data over a number of frames remains static during the tracking by an image processing engine, which may be configured as a finite state machine in one arrangement. How still the image pixel data is within the bounding box representing a detected object may be determined based on the weights associated with the pixel distribution, wherein a pixel may be classified as "static" if the weight of distribution of that pixel is greater than a predefined threshold. In one aspect, this degree or amount of staticness may be determined as a ratio of the number of static pixels in a foreground region over the total number of pixels of that region. In some examples, a threshold for a high staticness determination may be set when the ratio is greater than 0:5, though other values may be employed depending on the technique. Additional details regarding an example static area determination process may be found in U.S. Pat. No. 8,744,123, incorporated by reference herein.

At block 510, a grid map defining temporary static objects (e.g., as determined over a finite number of frames, each having a time period) may be generated based on applying any known or heretofore unknown SOG detection techniques including the techniques exemplified above. In one example embodiment, such grids may be determined based on the original resolution of the raw video. As a result, new grids may need to be generated to scale for the multiple bitrate resolutions used in ABR encoding of the video stream (e.g., scaling up or scaling down, for instance). Accordingly, the initial SOG/SAG coordinate information may be passed to a scaling function along with the desired ABR output resolutions, as set forth at blocks 512 and 514. At block 516, respective grid coordinate data per ABR encoding resolution as well as the timing window information is multiplexed, wherein the grid coordinate data is presented as SEI messages in the case of MP2TS or in udat atoms in the case of MP4 (part 14) containerization.

Figure 6:
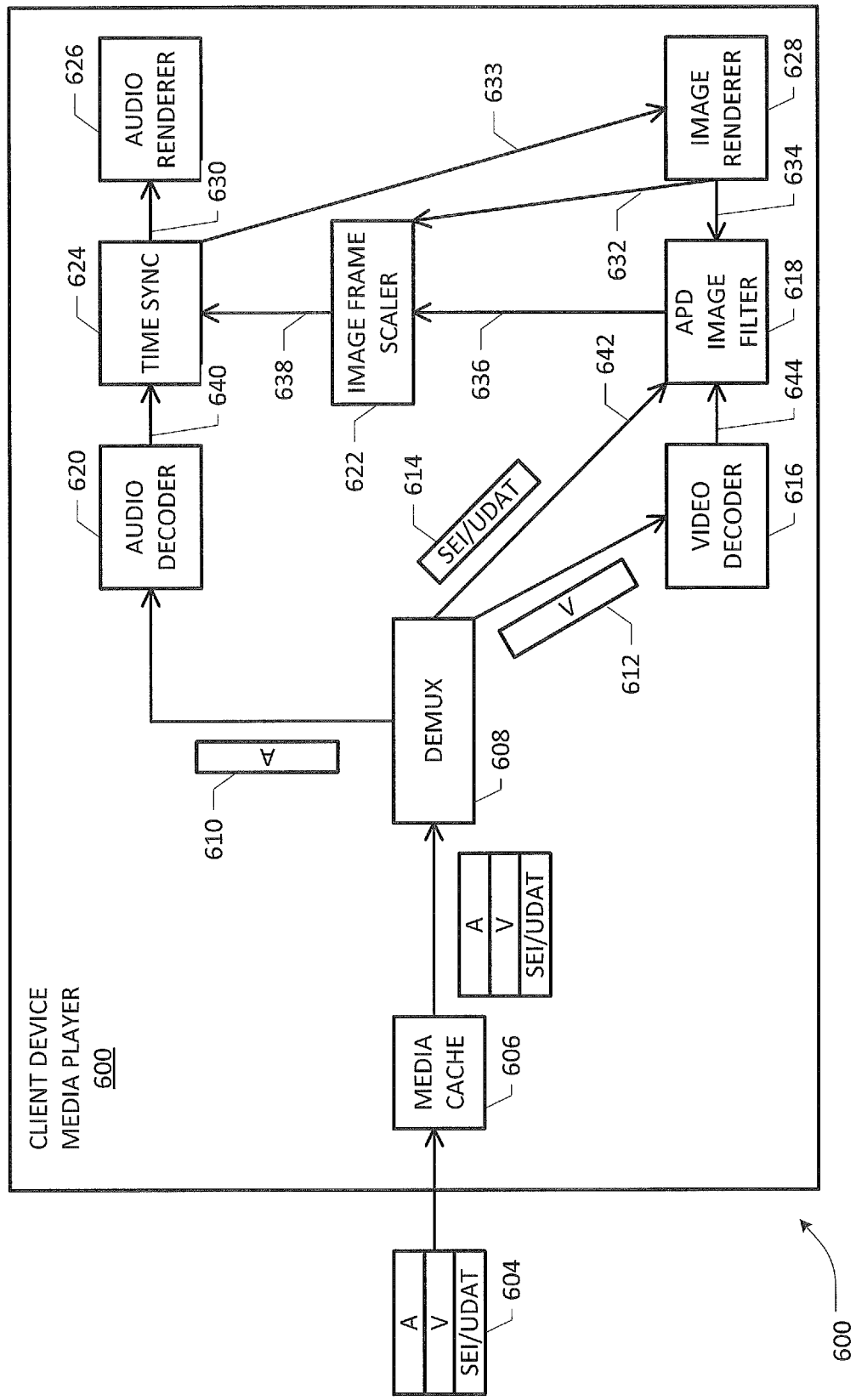
FIG. 6 is a block diagram of a client device media player configured to process a received media stream wherein static area information is signaled according to an embodiment of the present invention.

Turning to FIG. 6, depicted therein is a block diagram of a client device media player 600 configured to process a received media stream 604 wherein static area information is signaled according to an embodiment of the present invention. A media cache/buffer 606 associated with the client device media player 600 is operative to store received media 604 having audio, video and SEI/udat information when initially loaded. A de-multiplexer 608 in the client device player 600 is configured to retrieve the muxed/encoded media content from the media cache/buffer 606 and separate the encoded audio component 610, encoded video component 612 and the SOG coordinate data as SEI/udat messages 614. The encoded audio stream/component 610 is provided an audio decoder 620 that generates a decoded audio with timing window information 640. The encoded video stream/segment component 612 is provided to a video decoder 616 that generates decoded video with timing window information 644. The SEI/udat message component 614, which contains the grid coordinates and applicable time information, is provided to an adaptive post-decode (APD) image filter selection mechanism 618, which also receives decoded video with timing 644 and additional parameters pertaining to bitrate quality, video complexity, compression quantization (e.g., Quantization Parameter or QP in a lossy compression technique such as H.264, which may be used to derive a scaling matrix), among others. A client device image renderer 628 is also operative to provide display screen size and/or resolution information 634 to the APD filter selection mechanism 618. Responsive to at least a portion, combination or sub-combination of these various inputs, inter alia, the APD filter selection mechanism 618 is operative to select and apply a suitable image filter with respect to the SOG areas so as to ameliorate the negative effects of softening at the time of encoding, typically performed at the media source processing to address the high motion content in an incoming source media stream. In one embodiment, the APD filter selection mechanism 618 may therefore be configured to determine and apply an optimal calculated filter to the video at least based on the information it has received from the video encoder 616, the de-multiplexer 608 and the screen resolution information 634 that it has received from the image renderer 628.

Since a digital image is a discrete (e.g., sampled and/or quantized) version of a continuous function that maps parameters such as intensity, chromaticity, etc., at a pixel position (x, y), various image filtering techniques may be selected and applied as some form of a function based on a local neighborhood of each pixel to achieve an optimal/desired output in accordance with the teachings herein (e.g., to overcome any undesirable effects of video processing at the source media state). Accordingly, a post-decode filter may be designed to include features such as smoothing, sharpening, edge enhancement, anti-blur, and the like. As a neighborhood operation in which the value of any given pixel in the output image may be determined by applying some algorithm or mathematical functional relationship to the values of the pixels in a given neighborhood of the corresponding input pixel, the filtering operation may be defined as any class of linear filtering functions (where the value of an output pixel is a linear combination of the values of the pixels in the input pixel's defined neighborhood, such as e.g., convolution, cross-correlation, etc.), nonlinear filtering functions (where the value of an output pixel is a nonlinear combination of the values of the pixels in the input pixel's defined neighborhood, e.g., weighted median filters, etc.), an/or a combination thereof, that may be designed and applied on a SOG by SOG basis across an image frame. A post-decode filter (PDF) may therefore be advantageously selected in an ABR streaming environment according to an embodiment of the present invention responsive to, without limitation, at least one of: QP information, the particular bitrate representation of the video component, display screen size, video quality of the received video component, frame image resolution, codec resolution used at the media source node, image upscaling used at the client device, image downscaling used at the client device, display screen renderer resolution, Mean Opinion Score (MOS) estimation of the received video component, Peak Signal-to-Noise Ratio (PSNR), Structural Similarity (SSIM) index, Mean Square Error (MSE), PSNR-HVS-M (Human Visual System Model), and Multi-scale SSIM of the received video component, etc.

Continuing to refer to FIG. 6, a post-decode (PD)-filtered video with the time window information 636 may be provided to an image scaler 622, which is operative to size or scale the frame responsive to renderer resolution data 632 received from the image renderer 628. A properly scaled/sized and PD-filtered video with the time window information 638 is finally provided to a time synchronization block 624 that also receives decoded audio content with the time window information 640. The video and audio components are synchronized based the time window information and provided as synchronized audio and video data 630, 633, to respective renderers 626, 628 associated with the media player 600 for display/playback.

By way of example, a strong aggressive PDF such as one below may be applied to a high resolution low QP video, such as, e.g., 1080p QP10 video:

$$\begin{bmatrix} -128 & -256 & -128 \\ 256 & 2048 & -256 \\ -128 & 256 & -128 \end{bmatrix}$$

On the other hand, a low sharpening filter such as one below may be applied to a lower resolution video with high QP value like 720p and QP of 33:

$$\begin{bmatrix} -32 & -64 & -32 \\ -64 & 1024 & -64 \\ -32 & -64 & -32 \end{bmatrix}$$

Figure 7:
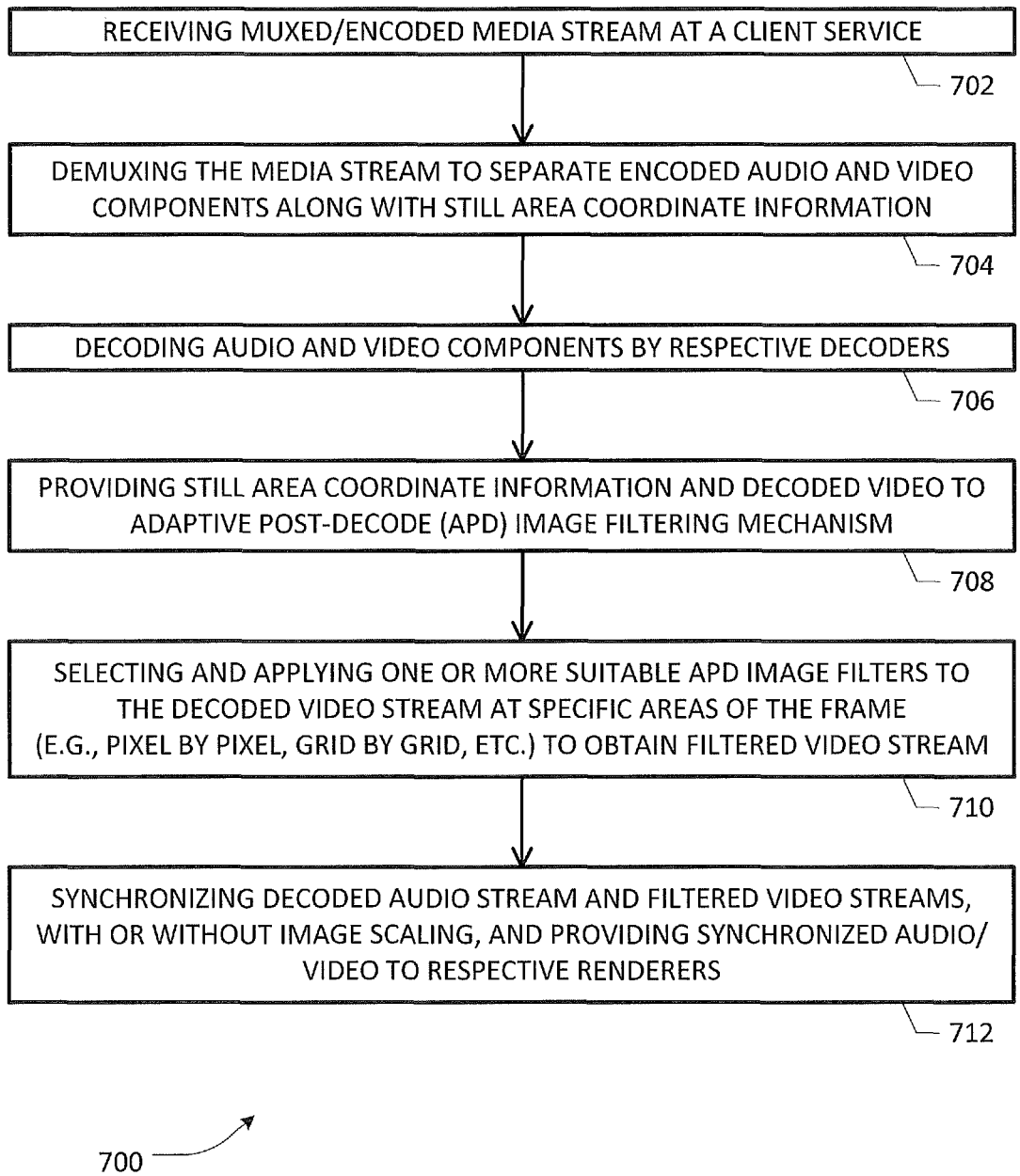
FIG. 7 is a flowchart illustrative of various blocks, steps and/or acts of a media processing method operative at a client device that may be (re)combined in one or more arrangements, with or without blocks, steps and/or acts of additional flowcharts of the present disclosure, for effectuating adaptive post-decode filtering with respect to the static areas/objects in the received video according to one or more embodiments of the present invention.

FIG. 7 is a flowchart illustrative of various blocks, steps and/or acts of a media processing method 700 operative at a client device that may be (re)combined in one or more arrangements, with or without blocks, steps and/or acts of additional flowcharts of the present disclosure, for effectuating adaptive post-decode filtering with respect to the static areas in the received video according to one or more embodiments of the present invention. At block 702, a muxed/encoded media stream is received at a client device, which may be an ABR streaming device operative to receive the media segments using HTTP or an MABR/UABR over RTP device. At block 704, the received media stream may be de-multiplexed (i.e., "de-muxed") to separate or otherwise obtain encoded audio and encoded video components along with still area coordinate information. Thereafter, the audio and video components may be decoded by respective decoders (block 706). Still area coordinate information and decoded video along with timing information may be provided to an APD image filtering mechanism (block 708) that is operative to select and apply one or more suitable APD image filters to the decoded video stream at specific areas of the frame (e.g., still areas) on a pixel-by-pixel basis, block-by-block basis, etc. for instance, to obtain a filtered video stream (block 710). Responsive to the timing window information, decoded audio stream and filtered video stream may be synchronized, with or without image scaling, as set forth at block 712. Thereafter, the synchronized video stream is provided to a display device associated with the client device, e.g., an integrated LCD/touch screen, a projector, a TV, a VR/AR headset, etc. Likewise, the synchronized audio stream may be provided to an audio playback system associated with the client device, e.g., either an internal speaker system or an externally connected audio system.

Figure 8A:
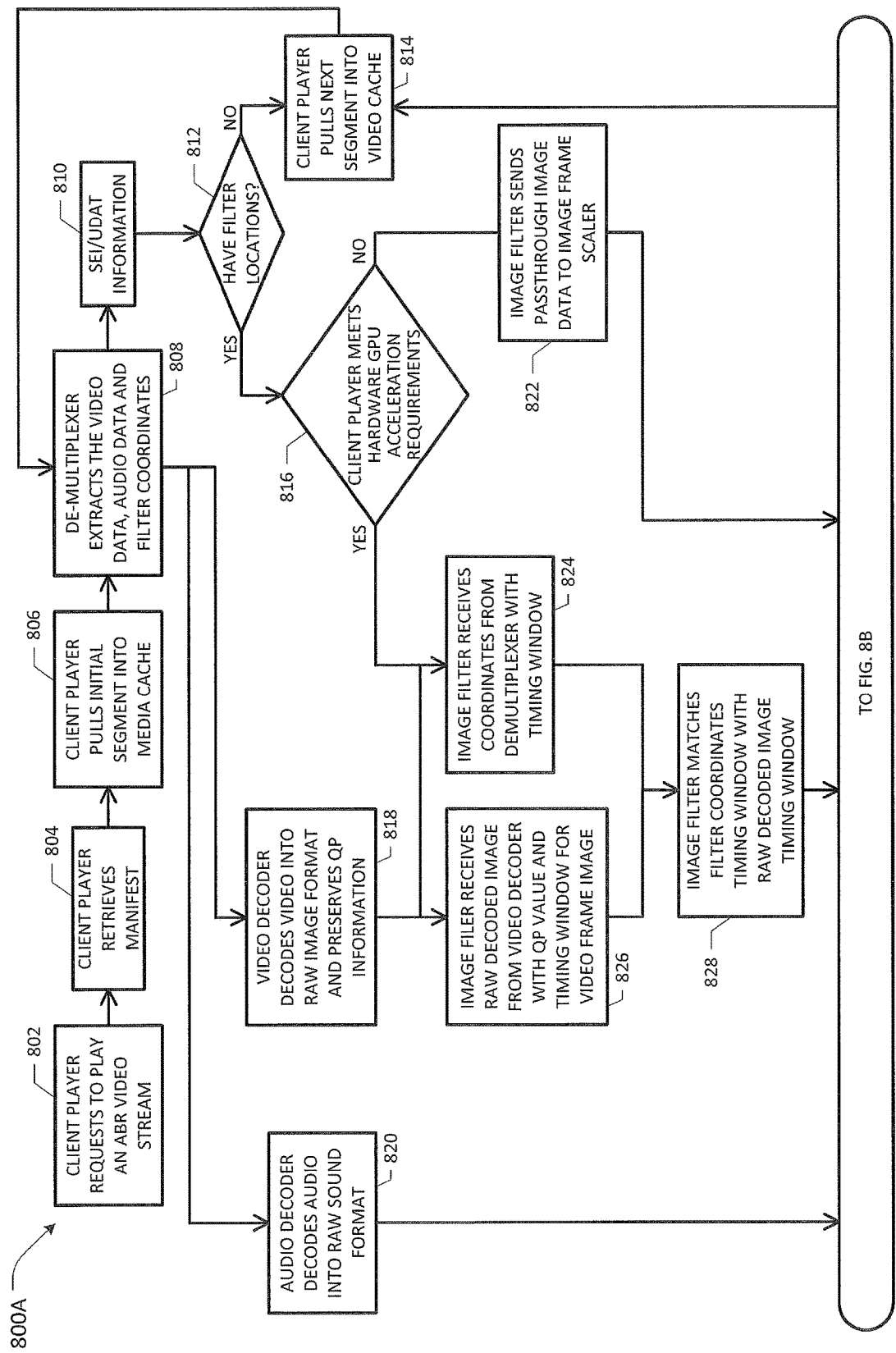
FIGS. 8A and 8B depict portions of a flowchart illustrative of a media processing method operative at an HTTP ABR client device according to an embodiment of the present invention.
Figure 8B:
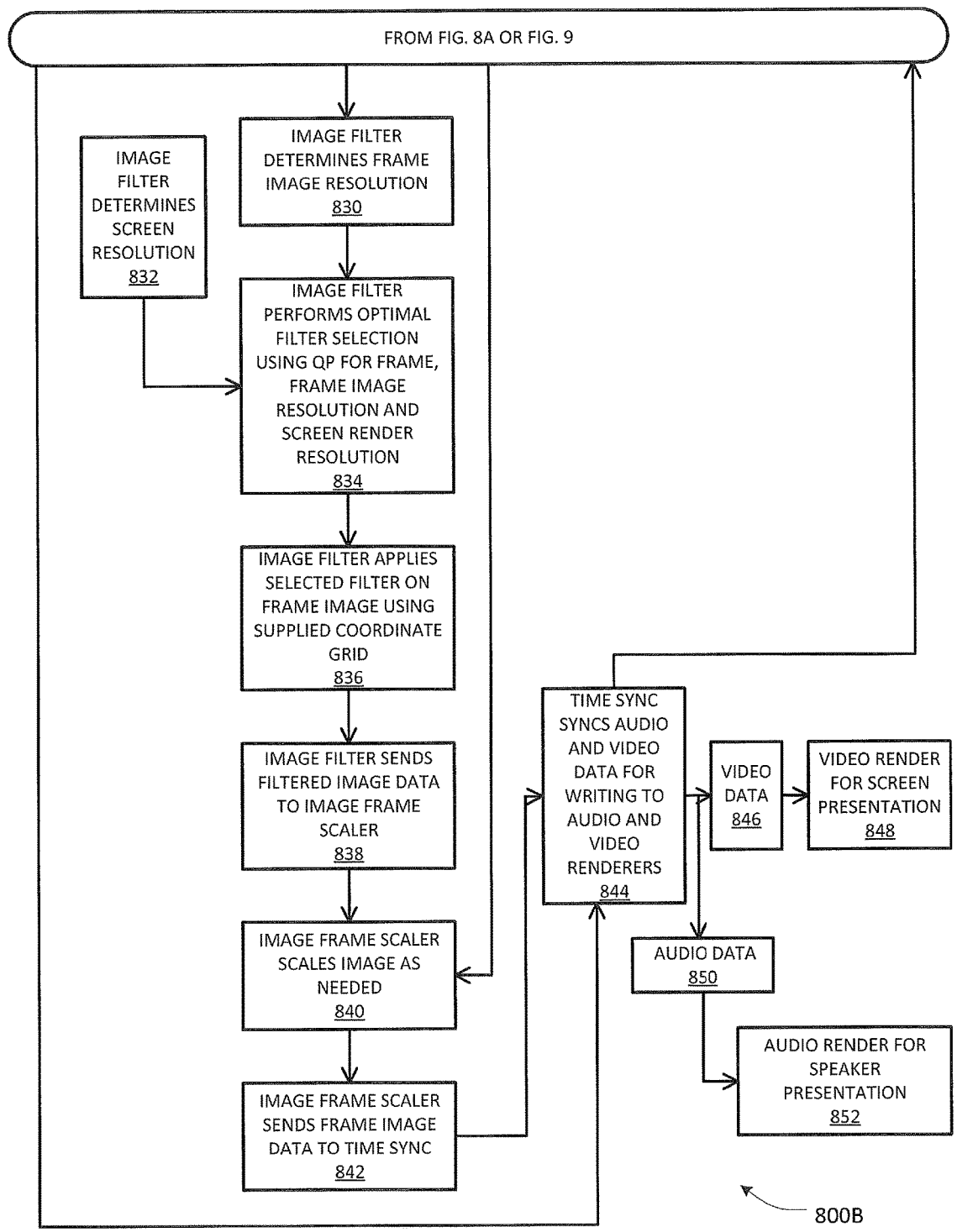

FIGS. 8A and 8B depict portions of a flowchart illustrative of a media processing method 800A/800B operative at an HTTP ABR client device according to an embodiment of the present invention with additional details that may be combined with other embodiments set forth hereinabove. Focusing on process flow portion 800A of FIG. 8A, the ABR client player requests to play an ABR video stream upon suitable user command input (block 802). At block 804, the ABR client player retrieves a manifest associated with the requested video stream. Based on bitrate adaption logic executing at the device, available/estimated bandwidth, network conditions, etc., and responsive to the bitrates and URLs indicated in the manifest, the client player pulls a particular bitrate representation of an initial media segment into a cache as shown at block 806. At block 808, a de-multiplexer extracts the video data, audio data and SOG coordinates to be used for PD filtering. An iterative loop process may be executed by the ABR client player wherein media segments continue to be pulled into the media cache for demux processing until the SOG information (e.g., SEI/udat information) having the PD filtering locations is extracted, as shown at blocks 810, 812, 814. Skilled artisans will therefore recognize that where there is no SOG information to be extracted over a period of time (or, equivalently, for a portion of the received media stream), the encoded video and audio content or components of the received media stream may continue to be processed for rendering in normal fashion for rendering/playback, as will be set forth in further detail below.

At block 818, extracted encoded video component is decoded into a raw image format wherein QP information is preserved. At block 826, the raw image format with the QP information and timing is received by an image filter. If the filter coordinate information has been extracted by the demux process as set forth at blocks 808, 810, 812, a further determination may be made as to whether the device player has sufficient hardware capability (e.g., graphic processor unit (GPU) accelerated image processing), as set forth decision block 816. If so, the filter coordinate information and associated timing information extracted from the demuxed media is also provided to the image filter as set forth at block 824. At block 828, the timing window information of the filter coordinates is matched with the timing window information of the raw decoded image format, which is then processed in subsequent steps set forth as part of the process flow portion 800B of FIG. 8B. As to the audio path processing, extracted encoded audio component is decoded into a raw audio format (block 820), which is provided to a timing synchronization process as set forth at block 844 shown as part of the process flow portion 800B of FIG. 8B.

Taking particular reference now to FIG. 8B, the image filter determines frame image resolution (block 830). Optionally or additionally, a device screen resolution is also obtained by the image filter as set forth at block 832. At block 834, an optimal PD filter is selected based on the various inputs as set forth in detail hereinabove. At block 836, the selected PD filter is applied to the frame image based on the received or supplied coordinate grid, thereby generating PD-filtered image data that is sent to an image scaler (as set forth at block 838), to the extent it is required. If required, the image scaler is operative to scale the filtered image to a suitable scale as needed (block 840). In one embodiment, if there is insufficient hardware/firmware/software capability as determined at decision block 816, the image data may simply bypass the foregoing PD-filtering process whereby the data may be passed through to the scaling process as set forth at blocks 822, 840.

Processed image data, which can be PD-filtered or otherwise, or scaled if needed, is thereafter forwarded to the time synchronization process as set forth at block 844. As noted previously, the audio and video data are accordingly synchronized based the timing information, whereupon the synchronized/uncompressed audio and video streams are written to the respective renderers for presentation via as set forth at blocks 850 and 852 for audio path and at blocks 846 and 848 for video path. A synchronization control messaging path may also be established to the functionality of block 814 to coordinate the client player's pulling of segments into its video cache.

Skilled artisans will recognize that the foregoing process flow is backward-compatible in the sense that if the filter location check or the hardware requirement check fails, the video stream is processed and rendered in a conventional manner. Accordingly, media processing involving SOG signaling at the server side and media processing involving PD-filtering at the device side may be independently implemented or rolled out without negatively impacting respective infrastructure deployments.

Figure 9:
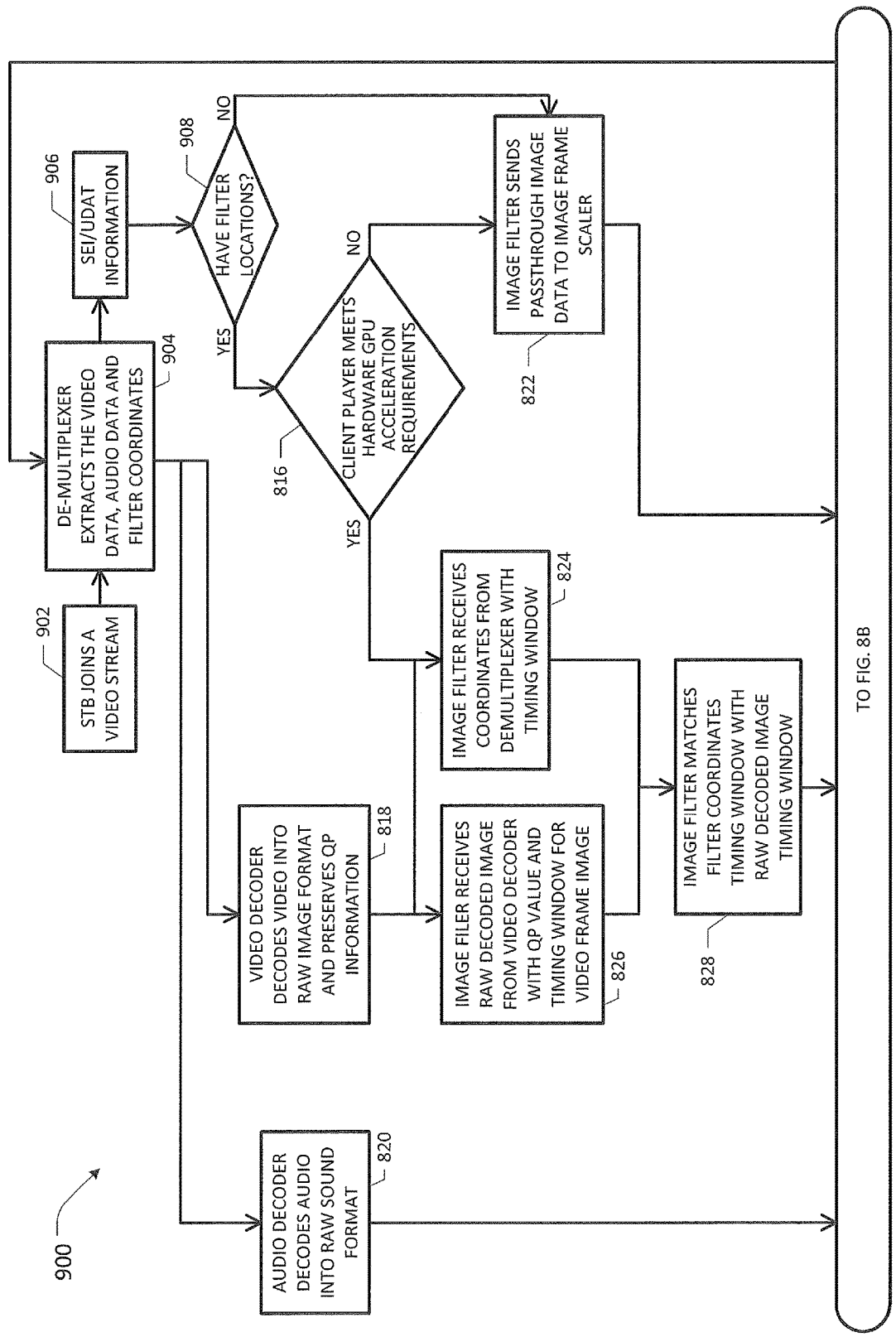
FIG. 9 depicts a portion of a flowchart that may be combined with FIG. 8B for illustrating a media processing method operative at a client device that receives media via MPEG Transport System (TS)-based streaming over RTP and/or multicast ABR streaming according to an embodiment of the present invention.

FIG. 9 depicts a flowchart portion 900 that may be combined with FIG. 8B for illustrating a media processing method operative at a client device that receives media via MPEG Transport System (TS)-based streaming over RTP or in an MABR network according to an embodiment of the present invention. One skilled in the art will appreciate that once a client device (e.g., HFC HTB or managed IPTV receiver) joins a requested stream (block 902), a de-multiplexer extracts the video, audio and filter coordinate information from the joined stream, as set forth at blocks 904, 906, 908, whereupon the subsequent processing may take place in a manner substantially identical to the media processing flow set forth in FIGS. 8A and 8B. Accordingly, the detailed description of FIGS. 8A and 8B provided above is also applicable, mutatis mutandis, in conjunction with the flowchart portion 900, which will not be repeated here, except to note that timing synchronization control messages may be provided to the demux functionality of 904 (rather than pulling of segments in to a cache as in an HTTP ABR client).

Figure 10:
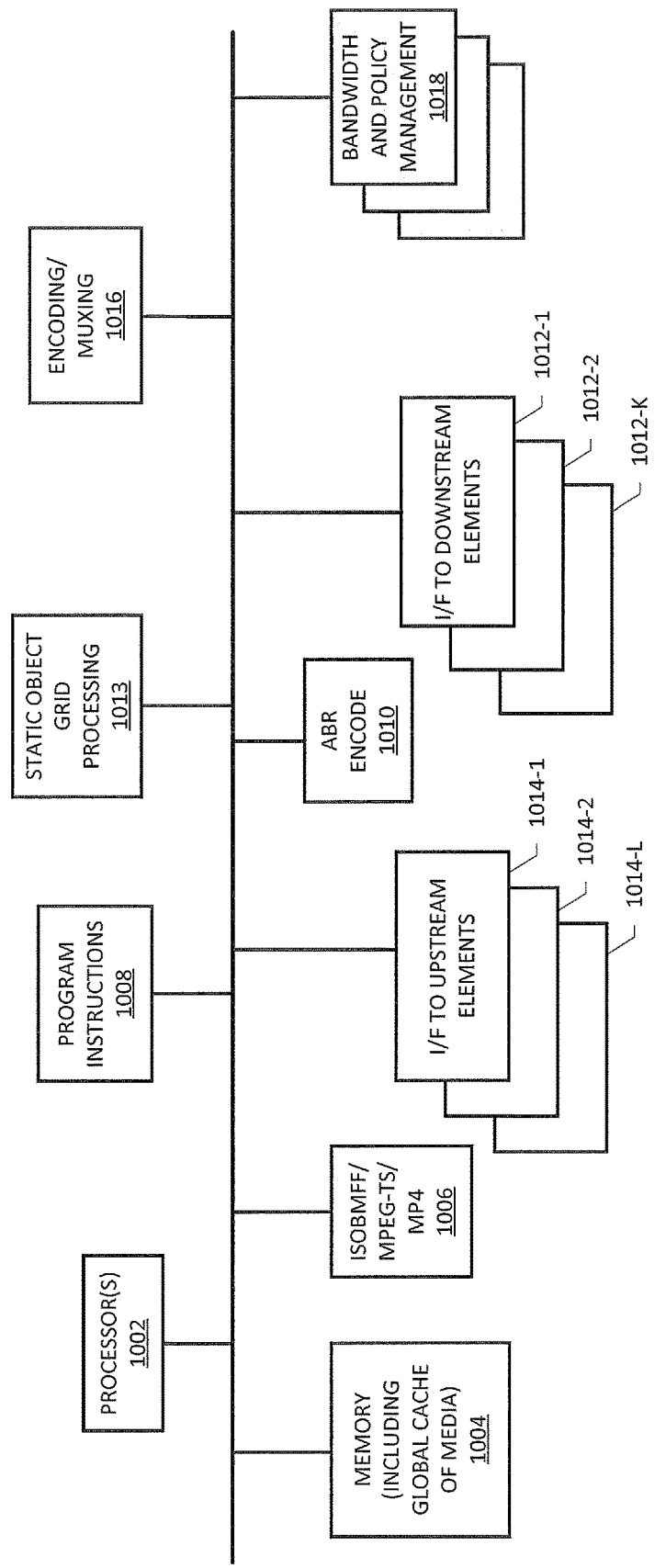
FIG. 10 depicts a block diagram of a computer-implemented apparatus that may be (re)configured and/or (re)arranged as a platform, node or element to effectuate media processing at an example media source system according to an embodiment of the present invention.

Turning to FIG. 10, depicted therein is a block diagram of a computer-implemented apparatus 1000 that may be (re)configured and/or (re)arranged as a platform, node or element to effectuate media processing at an example media source system according to an embodiment of the present invention. In one arrangement, therefore, apparatus 1000 may be configured as network element or sub-system 202 described hereinabove. One or more processors 1002 may be operatively coupled to various modules that may be implemented in persistent memory for executing suitable program instructions or code portions with respect to effectuating demux operations, audio/video component encoding and muxing, SOG/SAG extraction and processing, etc., as exemplified by modules 1008, 1010, 1013, 1016. A memory system including a global cache of media 1004 may be provided where apparatus 1000 may be deployed as a headend entity in a hierarchically organized media streaming network. A containerization module 1006 is operative for facilitating appropriate media containerization mechanisms as discussed in detail hereinabove, which may be based on ISO Base Media File Format (ISOBMFF) container format in some embodiments. ABR encoder/transcoder 1010 may be configured to encode the video content of a particular media asset into a number of video streams using variable bit rates, ranging from low to high bit rates (500 Kbps to 15 Mbps, by way of illustration), wherein each bitrate may be referred to as a profile or representation, indicative of different video qualities (e.g., standard definition or SD, high definition or HD, ultra HD or UHD etc.), as previously noted. Additional modules/functionalities 1018 relating to bandwidth and policy management may also be provided as part of apparatus 1000 in an example embodiment, wherein suitable program instructions or code 1008/1018 may be executed under control of processors 1002. Appropriate downstream interfaces (I/F) 1012-1 to 1012-K may be provided for facilitating connectivity to various downstream elements such as IGMP nodes, routers, DSLAM/CMTS elements, ABR segmenter/packager nodes, CDN nodes, etc., including mobile infrastructure elements where implemented, e.g., configured to effectuate distribution/delivery pipes to subscriber premises and/or end-user client devices. Likewise, appropriate interfaces 1014-1 to 1014-L to various upstream or co-hierarchical network elements and/or databases may be provided depending on a particular network node implementation. For example, in a source media platform implementation, such interfaces may include interfaces to one or more content provider/source feeds, stored media nodes, as well as various policy management nodes, such as subscriber policy management nodes, content/operator policy management nodes, etc., and the like. Accordingly, depending on the context, interfaces selected from interfaces 1014-1 to 1014-L or interfaces 1012-1 to 1012-K may sometimes be referred to as a first interface, a second interface, and the like.

Figure 11:
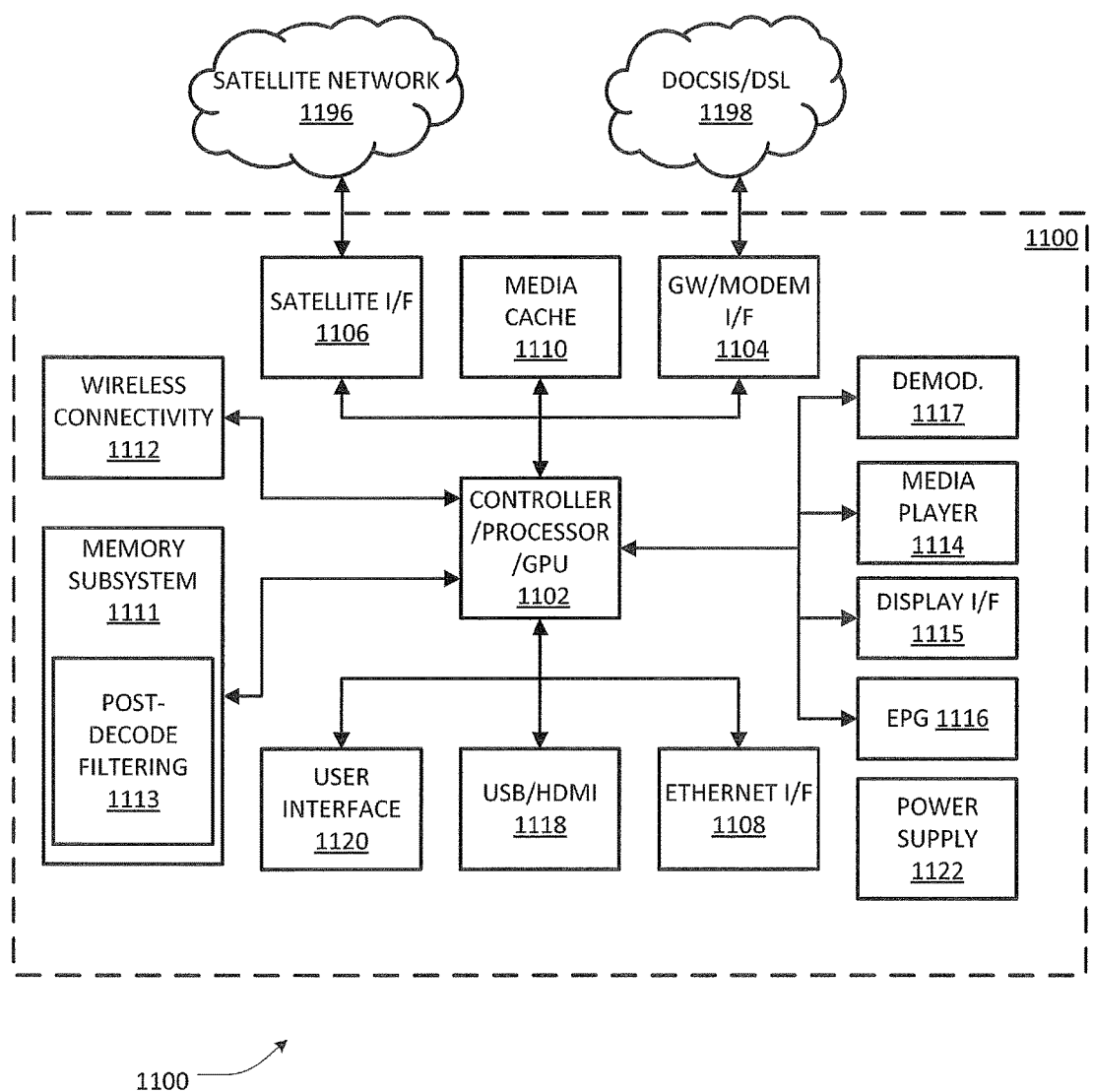
FIG. 11 depicts is a block diagram of an example UE device operative in effectuate adaptive post-decode filtering for purposes of an embodiment of the present patent disclosure.

FIG. 11 depicts is a block diagram of an example UE device 1100 operative in effectuate adaptive post-decode (APD) filtering for purposes of an embodiment of the present patent disclosure. It will be realized that UE device 1100 may be exemplary of an HTTP ABR client device or an STB/IPTV/MABR device that may be configured for performing various client-side processes according to one or more embodiments of the present patent disclosure, e.g., as set forth in the flowcharts of FIGS. 8A-8B and 9, inter alia. In one arrangement, therefore, UE device 1100 may be configured to include an embodiment of the client media player 600 described in detail hereinabove. One or more microcontrollers/processors and graphic processor units (GPUs) 1102 are provided for the overall control of the client device 1100 and for the execution of various stored program instructions embodied in a persistent memory 1113, e.g., including APD filtering, that may be part of a memory subsystem 1111 of the subscriber station 1100 operating in concert with a media player 1114. Controller/processor/GPU complex referred to by reference numeral 1102 may also be representative of other specialty processing modules such as graphic processors, video processors, digital signal processors (DSPs), and the like, operating in association with suitable video and audio interfaces (not specifically shown). Appropriate interfaces such as network I/F modules 1104 and 1106 involving or operating with tuners, demodulators, descramblers, MPEG/H.264/H.265 decoders/demuxes may be included for processing and interfacing with IPTV and other content signals received via a DSL/CMTS network 1198 or a satellite network 1196. Where an STB is configured as an example client device, suitable demodulators 1117 (e.g., may include NTSC demodulator and/or ATSC/PAL demodulator, and the like) as well as media decode/decrypt, etc., may also be included. Media player 1114 is exemplary of one or more media players provided for operating in conjunction with the other subsystems of the client device 1100 with respect to facilitating user control over media playback, including channel change requests. Example media players may be configured to operate with one or more AN coder/decoder (codec) functionalities based on known or hereto unknown standards or specifications including but not limited to, e.g., Moving Pictures Expert Group (MPEG) codecs (MPEG, MPEG-2, MPEG-4, etc.), H.264, H.265, and the like, as noted hereinabove.

Other I/O or interfaces such as a display interface 1115, Electronic Program Guide (EPG) 1116 for identifying media service channels (e.g., in an STB implementation), touch screen or keypad interface 1120, USB/HDMI ports 1118, Ethernet I/F 1108, and short-range and wide area wireless connectivity interfaces 1112 may also be provided depending on device configuration. A hard disk drive (HDD) or DVR system or a media cache 1110 may be included in an STB implementation for local storage of various program assets. A suitable power supply block 1122 may include AC/DC power conversion to provide power for the device 1100. It should be appreciated that the actual power architecture for the subscriber device 1100 may vary by the hardware platform used, e.g., depending upon the core SoC (System-on-Chip), memory, analog front-end, analog signal chain components and interfaces used in the specific platform, and the like.

One skilled in the art will recognize that various apparatuses and systems with respect to the foregoing embodiments, as well as the underlying network infrastructures set forth above may be architected in a virtualized environment according to a network function virtualization (NFV) architecture in additional or alternative embodiments of the present patent disclosure. For instance, various physical resources, databases, services, applications and functions executing within an example streaming network of the present application, including source media processing infrastructure, media containerization, ABR packaging, etc., set forth hereinabove may be provided as virtual appliances, machines or functions, wherein the resources and applications are virtualized into suitable virtual network functions (VNFs) or virtual network elements (VNEs) via a suitable virtualization layer. Resources comprising compute resources, memory resources, and network infrastructure resources are virtualized into corresponding virtual resources wherein virtual compute resources, virtual memory resources and virtual network resources are collectively operative to support a VNF layer, whose overall management and orchestration functionality may be supported by a virtualized infrastructure manager (VIM) in conjunction with a VNF manager and an NFV orchestrator. An Operation Support System (OSS) and/or Business Support System (BSS) component may typically be provided for handling network-level functionalities such as network management, fault management, configuration management, service management, and subscriber management, etc., which may interface with VNF layer and NFV orchestration components via suitable interfaces.

Furthermore, at least a portion of an example network architecture disclosed herein may be virtualized as set forth above and architected in a cloud-computing environment comprising a shared pool of configurable virtual resources. Various pieces of hardware/software associated with SOG extraction and processing, media/SOG muxing and containerization, ABR encoding, segmentation and manifest generation, and the like may be implemented in a service-oriented architecture, e.g., Software as a Service (SaaS), Platform as a Service (PaaS), infrastructure as a Service (IaaS) etc., with multiple entities providing different features of an example embodiment of the present invention, wherein one or more layers of virtualized environments may be instantiated on commercial off the shelf (COTS) hardware. Skilled artisans will also appreciate that such a cloud-computing environment may comprise one or more of private clouds, public clouds, hybrid clouds, community clouds, distributed clouds, multiclouds and interclouds (e.g., "cloud of clouds"), and the like.

In the above-description of various embodiments of the present disclosure, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and may not be interpreted in an idealized or overly formal sense expressly so defined herein.

At least some example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. Such computer program instructions may be provided to a processor circuit of a general purpose computer circuit, special purpose computer circuit, and/or other programmable data processing circuit to produce a machine, so that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s). Additionally, the computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

As pointed out previously, tangible, non-transitory computer-readable medium may include an electronic, magnetic, optical, electromagnetic, or semiconductor data storage system, apparatus, or device. More specific examples of the computer-readable medium would include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-ray). The computer program instructions may also be loaded onto or otherwise downloaded to a computer and/or other programmable data processing apparatus to cause a series of operational steps to be performed on the computer and/or other programmable apparatus to produce a computer-implemented process. Accordingly, embodiments of the present invention may be embodied in hardware and/or in software (including firmware, resident software, micro-code, etc.) that runs on a processor or controller, which may collectively be referred to as "circuitry," "a module" or variants thereof. Further, an example processing unit may include, by way of illustration, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGA) circuits, any other type of integrated circuit (IC), and/or a state machine. As can be appreciated, an example processor unit may employ distributed processing in certain embodiments.

Further, in at least some additional or alternative implementations, the functions/acts described in the blocks may occur out of the order shown in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Furthermore, although some of the diagrams include arrows on communication paths to show a primary direction of communication, it is to be understood that communication may occur in the opposite direction relative to the depicted arrows. Finally, other blocks may be added/inserted between the blocks that are illustrated.

It should therefore be clearly understood that the order or sequence of the acts, steps, functions, components or blocks illustrated in any of the flowcharts depicted in the drawing Figures of the present disclosure may be modified, altered, replaced, customized or otherwise rearranged within a particular flowchart, including deletion or omission of a particular act, step, function, component or block. Moreover, the acts, steps, functions, components or blocks illustrated in a particular flowchart may be inter-mixed or otherwise inter-arranged or rearranged with the acts, steps, functions, components or blocks illustrated in another flowchart in order to effectuate additional variations, modifications and configurations with respect to one or more processes for purposes of practicing the teachings of the present patent disclosure.

Although various embodiments have been shown and described in detail, the claims are not limited to any particular embodiment or example. None of the above Detailed Description should be read as implying that any particular component, element, step, act, or function is essential such that it must be included in the scope of the claims. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed by the present claims. Accordingly, those skilled in the art will recognize that the exemplary embodiments described herein can be practiced with various modifications and alterations within the spirit and scope of the claims appended below.

The invention claimed is:

1. A media processing method operative at a network node, the method comprising:
separating a video component and an audio component from an incoming source media input;
determining static object grid (SOG) coordinate information for still areas identified in the video component;
encoding the video component at different bitrates to generate a plurality of adaptive bitrate (ABR) representations of the video component;
scaling the SOG coordinate information with respect to each of the bitrate representations of the video component;
encoding the audio component to generate an encoded audio stream; and
multiplexing each bitrate representation of the video component with corresponding scaled SOG coordinate information and the encoded audio stream to generate a plurality of multiplexed media outputs for distribution to one or more subscriber stations.

2. The method as recited in claim 1, wherein the still areas in the video component are determined based on analyzing a plurality of video frames of the video component.

3. The method as recited in claim 1, further comprising:
providing the plurality of multiplexed media outputs to an adaptive bitrate (ABR) packager for segmenting each multiplexed media output into a segmented stream adapted for distribution over a content delivery network (CDN) using an ABR streaming protocol selected from at least one of: HTTP Smooth Streaming (HSS), HTTP adaptive streaming (HAS), Dynamic Adaptive Streaming over HTTP (DASH), HTTP Live Streaming (HLS), and HTTP Dynamic Streaming (HDS).

4. The method as recited in claim 1, further comprising:
containerizing each of the plurality of multiplexed media outputs in a format adapted for distribution using MPEG-2 Transport Stream (M2TS) container format or MPEG 4 part 14 (MP4) container format.

5. The method as recited in claim 1, further comprising:
providing the plurality of multiplexed media outputs to a stream-based distribution network for distribution using MPEG Transport Stream (TS)-based streaming over Real-time Transfer Protocol (RTP).

6. The method as recited in claim 1, further comprising: determining if the incoming source media input is encoded; and if so, decoding the video component prior to determining the SOG coordinate information with respect to the still areas in the decoded video component.

7. The method as recited in claim 1, wherein the SOG coordinate information is presented in one of a Supplemental Enhancement Information (SEI) message and a user data (udat) atom depending on whether MPEG-2 Transport Stream (M2TS) container format or MPEG-4 part 14 (MP4) container format is used for the plurality of multiplexed media outputs.

8. An apparatus configured to operate as a media processing node, the apparatus comprising:

at least one processor; and one or more persistent memory modules coupled to the at least one processor, wherein the persistent memory modules include program instructions which, when executed by the at least one processor, are configured to perform:

separate a video component and an audio component from an incoming source media input;

determine static object grid (SOG) coordinate information for still areas identified in the video component;

encode the video component at different bitrates to generate a plurality of adaptive bitrate (ABR) representations of the video component;

scale the SOG coordinate information with respect to each of the bitrate representations of the video component;

encode the audio component to generate an encoded audio stream; and multiplex each bitrate representation of the video component with corresponding scaled SOG coordinate information and the encoded audio stream to generate a plurality of multiplexed media outputs for distribution to one or more subscriber stations.

9. The apparatus as recited in claim 8, wherein the program instructions further include instructions for determining the still areas in the video component based on analyzing a plurality of video frames of the video component.

10. The apparatus as recited in claim 8, further comprising program instructions configured to provide the plurality of multiplexed media outputs to an adaptive bitrate (ABR) packager for segmenting each multiplexed media output into a segmented stream adapted for distribution over a content delivery network (CDN) using an ABR streaming protocol selected from at least one of: HTTP Smooth Streaming (HSS), HTTP adaptive streaming (HAS), Dynamic Adaptive Streaming over HTTP (DASH), HTTP Live Streaming (HLS), and HTTP Dynamic Streaming (HDS).

11. The apparatus as recited in claim 8, further comprising program instructions configured to provide the plurality of multiplexed media outputs to a stream-based distribution network for distribution using MPEG Transport Stream (TS)-based streaming over Real-time Transfer Protocol (RTP).

12. The apparatus as recited in claim 8, further comprising program instructions configured to containerize each of the plurality of multiplexed media outputs in a format adapted for distribution using MPEG-2 Transport Stream (M2TS) container format or MPEG 4 part 14 (MP4) container format.

13. The apparatus as recited in claim 8, further comprising program instructions configured to:

determine if the incoming source media input is encoded; and if so, decode the video component prior to determining the SOG coordinate information with respect to the still areas in the decoded video component.

14. The apparatus as recited in claim 8, further comprising program instructions configured to present the SOG coordinate information in one of a Supplemental Enhancement Information (SEI) message and a user data (udat) atom depending on whether MPEG-2 Transport Stream (M2TS) container format or MPEG-4 part 14 (MP4) container format is used for the plurality of multiplexed media outputs.

15. A media processing method operative at a client device, the method comprising:

receiving a multiplexed media stream containing an encoded video component, an encoded audio component and static object grid (SOG) coordinate information for still areas in the encoded video component, the encoded video component comprising a particular bitrate representation of a video component received at a media source node;

de-multiplexing the encoded video component, the encoded audio component and the SOG coordinate information from the multiplexed media stream;

decoding the encoded audio component to generate a decoded audio stream;

decoding the encoded video component to generate a decoded video stream;

providing the decoded video stream, the SOG coordinate information, timing information, and quantization parameter (QP) information extracted from the decoded video stream to an adaptive filtering mechanism;

selecting and applying a suitable post-decode filter for pixels of the decoded video stream based on the SOG coordinate information to generate a filtered video stream;

synchronizing the decoded audio stream and the filtered video stream; and providing synchronized audio and video streams to respective audio and video renderers for presentation at the client device.

16. The method as recited in claim 15, wherein the post-decode filter is selected responsive to at least one of: the QP information, the particular bitrate representation of the video component, display screen size, video quality of the received video component, frame image resolution, codec resolution used at the media source node, image upscaling used at the client device, image downscaling used at the client device, display screen renderer resolution, Mean Opinion Score (MOS) estimation of the received video component, Peak Signal-to-Noise Ratio (PSNR), Structural Similarity (SSIM) index, Mean Square Error (MSE), PSNR-HVS-M (Human Visual System), and Multi-scale SSIM of the received video component.

17. The method as recited in claim 15, wherein the post-decode filter is selected from a group comprising one or more linear image filters and one or more nonlinear image filters.

18. The method as recited in claim 15, wherein the SOG coordinate information is received in one of a Supplemental Enhancement Information (SEI) message and a user data (udat) atom depending on whether the multiplexed media stream is received in MPEG-2 Transport Stream (M2TS) container format or MPEG-4 part 14 (MP4) container format.

19. A client device operative to play multimedia content, the client device comprising:
- a media player including a media cache, one or more graphics processors, and one or more persistent memory modules coupled to the media cache and the one or more graphics processors, wherein the persistent memory modules include program instructions which, when executed by the one or more graphics processors, are configured to perform:
   - de-multiplex an encoded video component, an encoded audio component and static object grid (SOG) coordinate information from a multiplexed media stream received in the media cache, the multiplexed media stream containing the encoded video component, the encoded audio component and the SOG coordinate information for still areas in the encoded video component, the encoded video component comprising a particular bitrate representation of a video component received at a media source node;
   - decode the encoded audio component to generate a decoded audio stream;
   - decode the encoded video component to generate a decoded video stream;
   - provide the decoded video stream, the SOG coordinate information, timing information, and quantization parameter (QP) information extracted from the decoded video stream to an adaptive filtering mechanism;
   - select and apply a suitable post-decode filter for pixels of the decoded video stream based on the SOG coordinate information to generate a filtered video stream;
   - synchronize the decoded audio stream and the filtered video stream; and
   - provide synchronized audio and video streams to respective audio and video renderers for presentation at the client device.

20. The client device as recited in claim 19, wherein the program instructions comprise instructions configured to select a post-decode filter responsive to at least one of: the QP information, the particular bitrate representation of the video component, display screen size, video quality of the received video component, frame image resolution, codec resolution used at the media source node, image upscaling used at the client device, image downscaling used at the client device, display screen renderer resolution, Mean Opinion Score (MOS) estimation of the received video component, Peak Signal-to-Noise Ratio (PSNR), Structural Similarity (SSIM) index, Mean Square Error (MSE), PSNR-HVS-M (Human Visual System), and Multi-scale SSIM of the received video component.

21. The client device as recited in claim 19, wherein the post-decode filter comprises a filter selected from a group comprising one or more linear image filters and one or more nonlinear image filters.

22. The client device as recited in claim 19, wherein the SOG coordinate information comprises information received in one of a Supplemental Enhancement Information (SEI) message and a user data (udat) atom depending on whether the multiplexed media stream is received in MPEG-2 Transport Stream (M2TS) container format or MPEG-4 part 14 (MP4) container format.

* * * * *